(12) United States Patent
Chao

(10) Patent No.: US 7,874,937 B2
(45) Date of Patent: *Jan. 25, 2011

(54) COMPOSITE ARTICLES AND METHODS FOR MAKING THE SAME

(75) Inventor: Bing-Ling Chao, San Diego, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 12/004,387

(22) Filed: Dec. 19, 2007

(65) Prior Publication Data

US 2009/0163292 A1 Jun. 25, 2009

(51) Int. Cl.
*A63B 53/04* (2006.01)
(52) U.S. Cl. ........................... 473/342; 473/347
(58) Field of Classification Search .......... 473/324–350
See application file for complete search history.

(56) References Cited

U.S. PATENT DOCUMENTS

| | | | |
|---|---|---|---|
| 3,836,153 A | 9/1974 | Dance, Jr. | |
| 3,937,474 A | 2/1976 | Jepson et al. | |
| 4,398,965 A | 8/1983 | Campau | |
| 4,545,580 A | 10/1985 | Tomita et al. | |
| 4,618,149 A | 10/1986 | Maxel | |
| 4,630,826 A * | 12/1986 | Nishigaki et al. | 473/329 |
| 4,740,345 A | 4/1988 | Nagasaki et al. | |
| 4,792,139 A | 12/1988 | Nagasaki et al. | |
| 4,793,616 A | 12/1988 | Fernandez | |
| 4,798,383 A | 1/1989 | Nagasaki et al. | |
| 4,809,978 A | 3/1989 | Yamaguchi et al. | |
| 4,848,747 A | 7/1989 | Fujimura et al. | |
| 4,884,812 A | 12/1989 | Nagasaki et al. | |
| 4,900,379 A | 2/1990 | Chapman | |
| 4,928,972 A | 5/1990 | Nakanishi et al. | |
| 4,964,640 A | 10/1990 | Nakanishi et al. | |
| 4,995,609 A | 2/1991 | Parente et al. | |

(Continued)

FOREIGN PATENT DOCUMENTS

EP 1172189 1/2002

(Continued)

OTHER PUBLICATIONS

Taylor Made '94/'95 Products—Mid Tour; Mid Tour GF (1 page).

(Continued)

*Primary Examiner*—Alvin A Hunter
(74) *Attorney, Agent, or Firm*—Klarquist Sparkman, LLP

(57) ABSTRACT

The present disclosure pertains to composite articles, and in particular a composite face plate for a golf club-head, and methods for making the same. In certain embodiments, a composite face plate for a club-head is formed with a cross-sectional profile having a varying thickness. The face plate comprises a lay-up of multiple, composite prepreg plies. At least a portion of the plies comprise a plurality of elongated prepreg strips arranged in a predetermined criss-cross pattern in the lay-up. The prepreg strips create one or more areas of increased thickness where the strips overlap each other, thereby creating a desired profile for the plate. Metallic or polymer covers or cover layers can be used to define a striking surface.

24 Claims, 27 Drawing Sheets

U.S. PATENT DOCUMENTS

| | | | |
|---|---|---|---|
| 5,016,882 A | | 5/1991 | Fujimura et al. |
| 5,078,397 A | | 1/1992 | Aizawa |
| 5,176,384 A | | 1/1993 | Sata et al. |
| 5,271,621 A | | 12/1993 | Lo |
| 5,310,185 A | * | 5/1994 | Viollaz et al. .............. 473/330 |
| 5,312,106 A | | 5/1994 | Cook |
| 5,377,986 A | * | 1/1995 | Viollaz et al. .............. 473/330 |
| 5,417,419 A | | 5/1995 | Anderson et al. |
| 5,425,538 A | * | 6/1995 | Vincent et al. ............. 473/342 |
| 5,447,311 A | * | 9/1995 | Viollaz et al. .............. 473/342 |
| 5,472,201 A | | 12/1995 | Aizawa et al. |
| 5,672,120 A | | 9/1997 | Ramirez et al. |
| 5,743,813 A | | 4/1998 | Chen et al. |
| 5,766,094 A | | 6/1998 | Mahaffey et al. |
| 5,827,131 A | | 10/1998 | Mahaffey et al. |
| 5,967,903 A | | 10/1999 | Cheng |
| 5,985,197 A | | 11/1999 | Nelson et al. |
| 6,071,200 A | | 6/2000 | Song |
| 6,152,833 A | | 11/2000 | Werner et al. |
| 6,165,081 A | | 12/2000 | Chou |
| 6,248,024 B1 | | 6/2001 | Nelson et al. |
| 6,248,025 B1 | | 6/2001 | Murphy et al. |
| 6,299,547 B1 | | 10/2001 | Kosmatka |
| 6,319,150 B1 | * | 11/2001 | Werner et al. .............. 473/349 |
| 6,338,683 B1 | | 1/2002 | Kosmatka |
| 6,354,962 B1 | | 3/2002 | Galloway et al. |
| 6,364,789 B1 | | 4/2002 | Kosmatka |
| 6,368,234 B1 | | 4/2002 | Galloway |
| 6,406,378 B1 | | 6/2002 | Murphy et al. |
| 6,406,381 B2 | | 6/2002 | Murphy et al. |
| 6,428,427 B1 | | 8/2002 | Kosmatka |
| 6,435,980 B1 | | 8/2002 | Reyes et al. |
| 6,440,008 B2 | | 8/2002 | Murphy et al. |
| 6,669,577 B1 | | 12/2003 | Hocknell et al. |
| 6,800,038 B2 | | 10/2004 | Willett et al. |
| 6,824,475 B2 | | 11/2004 | Burnett et al. |
| 6,904,663 B2 | | 6/2005 | Willett et al. |
| 6,955,612 B2 | | 10/2005 | Lu |
| 7,066,832 B2 | | 6/2006 | Willett et al. |
| 7,082,665 B2 | | 8/2006 | Deshmukh et al. |
| 7,189,165 B2 | | 3/2007 | Yamamoto |
| 7,214,143 B2 | | 5/2007 | Deshmukh |
| 7,267,620 B2 | * | 9/2007 | Chao et al. .................. 473/342 |
| 7,367,899 B2 | | 5/2008 | Rice et al. |
| 7,402,112 B2 | | 7/2008 | Galloway |
| 7,491,136 B2 | | 2/2009 | Deng et al. |
| 7,628,712 B2 | | 12/2009 | Chao et al. |
| 2002/0169034 A1 | | 11/2002 | Hocknell et al. |
| 2004/0235584 A1 | | 11/2004 | Chao et al. |
| 2005/0239575 A1 | | 10/2005 | Chao et al. |
| 2007/0219016 A1 | | 9/2007 | Deshmukh |
| 2008/0139334 A1 | | 6/2008 | Willett et al. |
| 2008/0146374 A1 | | 6/2008 | Beach et al. |
| 2008/0300068 A1 | | 12/2008 | Chao |
| 2009/0163289 A1 | | 6/2009 | Chao |
| 2009/0163291 A1 | * | 6/2009 | Chao .......................... 473/342 |
| 2009/0163296 A1 | * | 6/2009 | Chao .......................... 473/348 |

FOREIGN PATENT DOCUMENTS

| | | | | |
|---|---|---|---|---|
| GB | 1201648 | | | 8/1970 |
| GB | 2268412 A | | | 1/1994 |
| JP | 60-15145 | | | 1/1985 |
| JP | 01314583 A | | | 12/1989 |
| JP | 01314779 A | | | 12/1989 |
| JP | 02005979 A | | | 1/1990 |
| JP | 02191475 A | * | | 7/1990 |
| JP | 05076628 A | * | | 3/1993 |
| JP | 05237207 A | * | | 9/1993 |
| JP | 06007485 A | * | | 1/1994 |
| JP | 06015016 A | * | | 1/1994 |
| JP | 6-23071 | | | 2/1994 |
| JP | 06-165842 | | | 6/1994 |
| JP | 06165842 A | * | | 6/1994 |
| JP | 6-205858 | | | 7/1994 |
| JP | 08071187 A | * | | 3/1996 |
| JP | 08215354 A | * | | 8/1996 |
| JP | 08280855 A | * | | 10/1996 |
| JP | 09-176347 | | | 7/1997 |
| JP | 11-137734 | | | 5/1999 |
| JP | 11290488 A | | | 10/1999 |
| JP | 200162652 A | | | 3/2001 |
| JP | 2001276285 A | * | | 10/2001 |
| JP | 2004329544 A | * | | 11/2004 |
| JP | 2004344664 A | * | | 12/2004 |
| JP | 2008194495 A | * | | 8/2008 |
| WO | WO 9300968 A1 | * | | 1/1993 |
| WO | WO 2004065083 A1 | * | | 8/2004 |
| WO | WO 2005028038 A1 | * | | 3/2005 |

OTHER PUBLICATIONS

Office Action from the United States Patent & Trademark Office in co-pending U.S. Appl. No. 12/156,947, dated Mar. 5, 2010.

Notice of Allowance and Fee(s) Due from the United States Patent & Trademark Office in co-pending U.S. Appl. No. 12/004,386, dated Mar. 1, 2010.

* cited by examiner

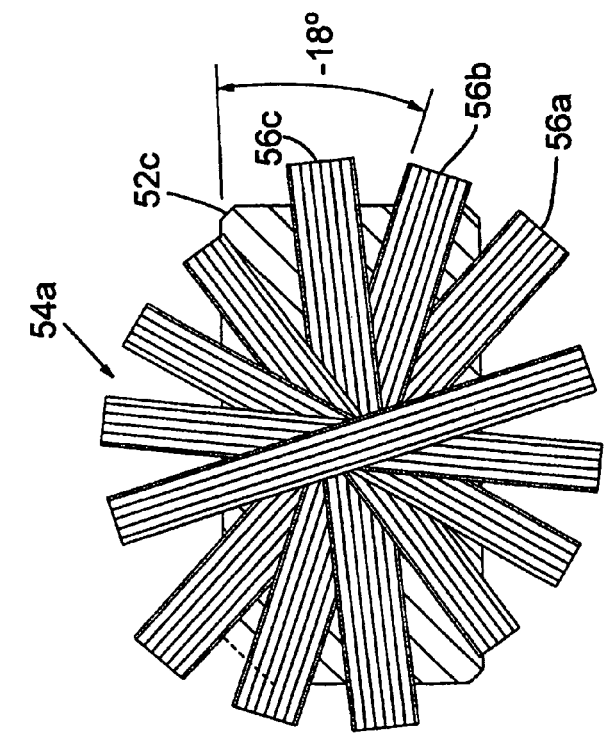
FIG. 8A  −18° ORIENTATION
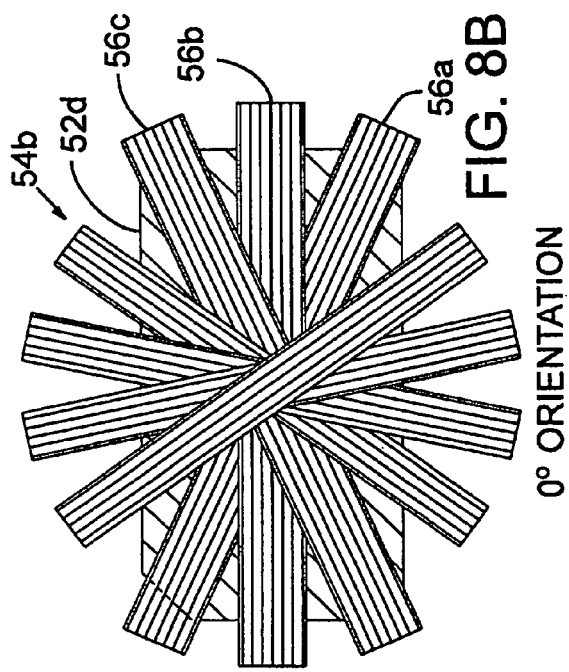
FIG. 8B  0° ORIENTATION
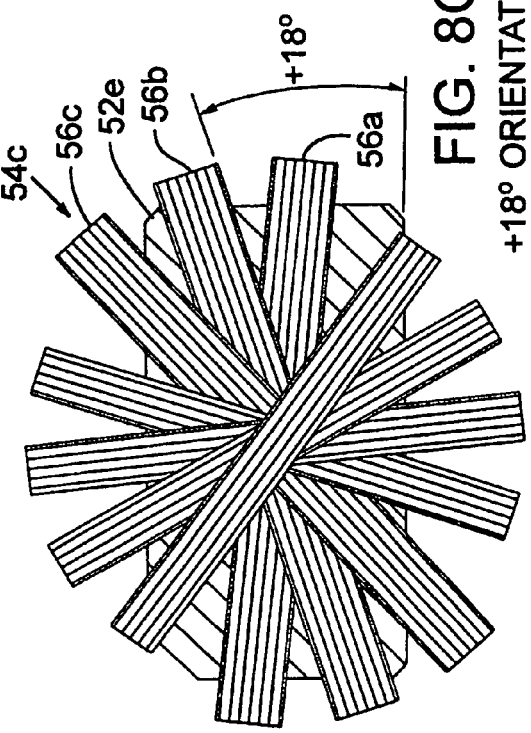
FIG. 8C  +18° ORIENTATION

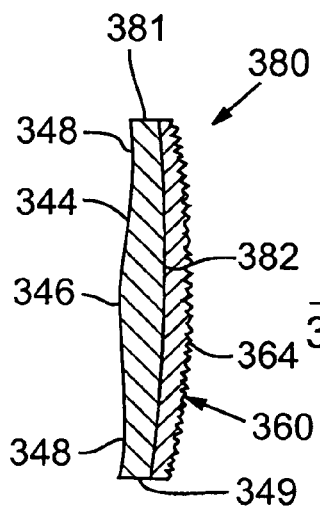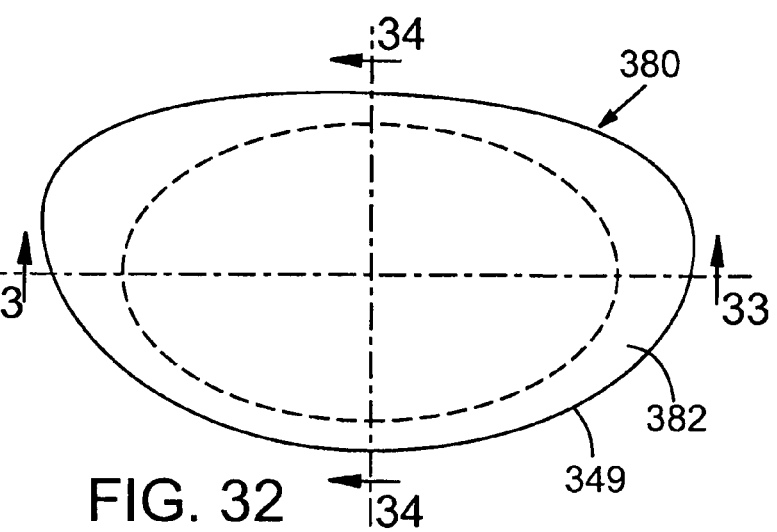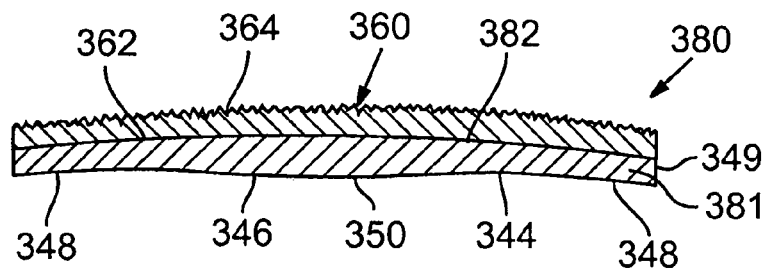

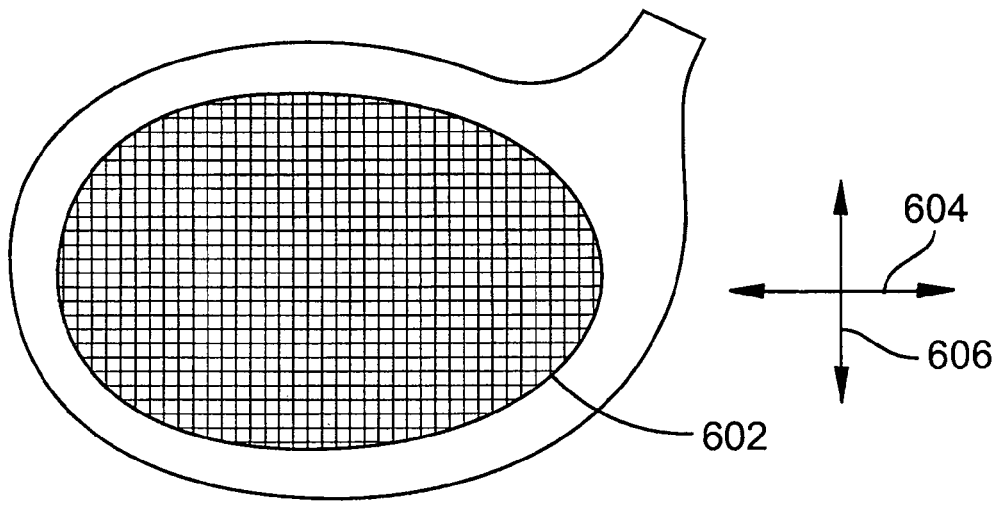
FIG. 40
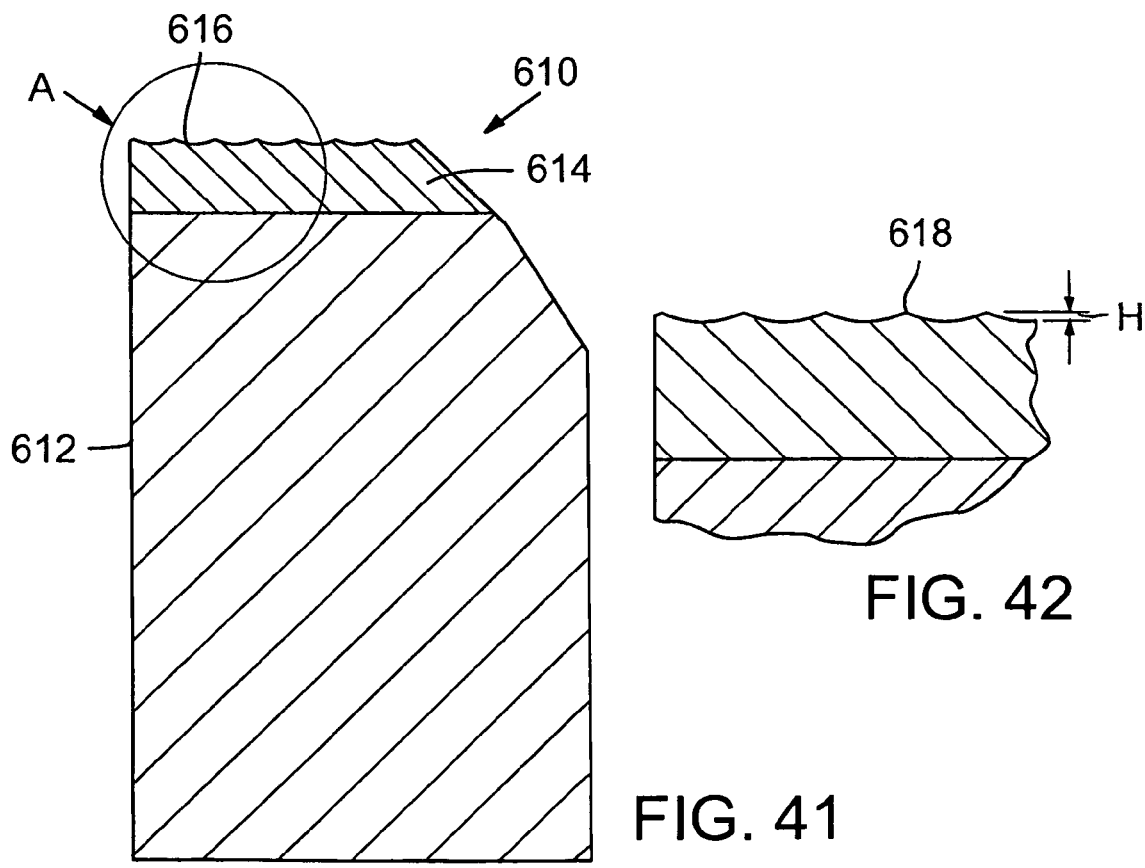
FIG. 42
FIG. 41

COMPOSITE ARTICLES AND METHODS FOR MAKING THE SAME

FIELD

This disclosure pertains generally to composite articles. More particularly, the disclosure pertains to, inter alia, golf clubs and club-heads that have a composite face insert.

BACKGROUND

With the ever-increasing popularity and competitiveness of golf, substantial effort and resources are currently being expended to improve golf clubs so that increasingly more golfers can have more enjoyment and more success at playing golf. Much of this improvement activity has been in the realms of sophisticated materials and club-head engineering. For example, modern "wood-type" golf clubs (notably, "drivers," "fairway woods," and "utility clubs"), with their sophisticated shafts and non-wooden club-heads, bear little resemblance to the "wood" drivers, low-loft long-irons, and higher numbered fairway woods used years ago. These modern wood-type clubs are generally called "metal-woods."

An exemplary metal-wood golf club such as a fairway wood or driver typically includes a hollow shaft having a lower end to which the club-head is attached. Most modern versions of these club-heads are made, at least in part, of a light-weight but strong metal such as titanium alloy. The club-head comprises a body to which a strike plate (also called a face plate) is attached or integrally formed. The strike plate defines a front surface or strike face that actually contacts the golf ball.

The current ability to fashion metal-wood club-heads of strong, light-weight metals and other materials has allowed the club-heads to be made hollow. Use of materials of high strength and high fracture toughness has also allowed club-head walls to be made thinner, which has allowed increases in club-head size, compared to earlier club-heads. Larger club-heads tend to provide a larger "sweet spot" on the strike plate and to have higher club-head inertia, thereby making the club-heads more "forgiving" than smaller club-heads. Characteristics such as size of the sweet spot are determined by many variables including the shape profile, size, and thickness of the strike plate as well as the location of the center of gravity (CG) of the club-head.

The distribution of mass around the club-head typically is characterized by parameters such as rotational moment of inertia (MOI) and CG location. Club-heads typically have multiple rotational MOIs, each associated with a respective Cartesian reference axis (x, y, z) of the club-head. A rotational MOI is a measure of the club-head's resistance to angular acceleration (twisting or rotation) about the respective reference axis. The rotational MOIs are related to, inter alia, the distribution of mass in the club-head with respect to the respective reference axes. Each of the rotational MOIs desirably is maximized as much as practicable to provide the club-head with more forgiveness.

Another factor in modern club-head design is the face plate. Impact of the face plate with the golf ball results in some rearward instantaneous deflection of the face plate. This deflection and the subsequent recoil of the face plate are expressed as the club-head's coefficient of restitution (COR). A thinner face plate deflects more at impact with a golf ball and potentially can impart more energy and thus a higher rebound velocity to the struck ball than a thicker or more rigid face plate. Because of the importance of this effect, the COR of clubs is limited under United States Golf Association (USGA) rules.

Regarding the total mass of the club-head as the club-head's mass budget, at least some of the mass budget must be dedicated to providing adequate strength and structural support for the club-head. This is termed "structural" mass. Any mass remaining in the budget is called "discretionary" or "performance" mass, which can be distributed within the club-head to address performance issues, for example.

Some current approaches to reducing structural mass of a club-head are directed to making at least a portion of the club-head of an alternative material. Whereas the bodies and face plates of most current metal-woods are made of titanium alloy, several "hybrid" club-heads are available that are made, at least in part, of components formed from both graphite/epoxy-composite (or another suitable composite material) and a metal alloy. For example, in one group of these hybrid club-heads a portion of the body is made of carbon-fiber (graphite)/epoxy composite and a titanium alloy is used as the primary face-plate material. Other club-heads are made entirely of one or more composite materials. Graphite composites have a density of approximately 1.5 g/cm$^3$, compared to titanium alloy which has a density of 4.5 g/cm$^3$, which offers tantalizing prospects of providing more discretionary mass in the club-head.

Composite materials that are useful for making club-head components comprise a fiber portion and a resin portion. In general the resin portion serves as a "matrix" in which the fibers are embedded in a defined manner. In a composite for club-heads, the fiber portion is configured as multiple fibrous layers or plies that are impregnated with the resin component. The fibers in each layer have a respective orientation, which is typically different from one layer to the next and precisely controlled. The usual number of layers is substantial, e.g., fifty or more. During fabrication of the composite material, the layers (each comprising respectively oriented fibers impregnated in uncured or partially cured resin; each such layer being called a "prepreg" layer) are placed superposedly in a "lay-up" manner. After forming the prepreg lay-up, the resin is cured to a rigid condition.

Conventional processes by which fiber-resin composites are fabricated into club-head components utilize high (and sometimes constant) pressure and temperature to cure the resin portion in a minimal period of time. The processes desirably yield components that are, or nearly are, "net-shape," by which is meant that the components as formed have their desired final configurations and dimensions. Making a component at or near net-shape tends to reduce cycle time for making the components and to reduce finishing costs. Unfortunately, at least three main defects are associated with components made in this conventional fashion: (a) the components exhibit a high incidence of composite porosity (voids formed by trapped air bubbles or as a result of the released gases during a chemical reaction); (b) a relatively high loss of resin occurs during fabrication of the components; and (c) the fiber layers tend to have "wavy" fibers instead of straight fibers. Whereas some of these defects may not cause significant adverse effects on the service performance of the components when the components are subjected to simple (and static) tension, compression, and/or bending, component performance typically will be drastically reduced whenever these components are subjected to complex loads, such as dynamic and repetitive loads (i.e., repetitive impact and consequent fatigue).

Manufacturers of metal wood golf club-heads have more recently attempted to manipulate the performance of their club heads by designing what is generically termed a variable face thickness profile for the striking face. It is known to fabricate a variable-thickness composite striking plate by first forming a lay-up of prepreg plies, as described above, and then adding additional "partial" layers or plies that are smaller than the overall size of the plate in the areas where additional thickness is desired (referred to as the "partial ply" method). For example, to form a projection on the rear surface of a composite plate, a series of annular plies, gradually decreasing in size, are added to the lay-up of prepreg plies.

Unfortunately, variable-thickness composite plates manufactured using the partial ply method are susceptible to a high incidence of composite porosity because air bubbles tend to remain at the edges of the partial plies (within the impact zone of the plate). Moreover, the reinforcing fibers in the prepreg plies are ineffective at their ends. The ends of the fibers of the partial plies within the impact zone are stress concentrations, which can lead to premature delamination and/or cracking. Furthermore, the partial plies can inhibit the steady outward flow of resin during the curing process, leading to resin-rich regions in the plate. Resin-rich regions tend to reduce the efficacy of the fiber reinforcement, particularly since the force resulting from golf-ball impact is generally transverse to the orientation of the fibers of the fiber reinforcement.

Typically, conventional CNC machining is used during the manufacture of composite face plates, such as for trimming a cured part. Because the tool applies a lateral cutting force to the part (against the peripheral edge of the part), it has been found that such trimming can pull fibers or portions thereof out of their plies and/or induce horizontal cracks on the peripheral edge of the part. As can be appreciated, these defects can cause premature delamination and/or other failure of the part.

While durability limits the application of non-metals in striking plates, even durable plastics and composites exhibit some additional deficiencies. Typical metallic striking plates include a fine ground striking surface (and for iron-type golf clubs may include a series of horizontal grooves) that tends to promote a preferred ball spin in play under wet conditions. This fine ground surface appears to provide a relief volume for water present at a striking surface/ball impact area so that impact under wet conditions produces a ball trajectory and shot characteristics similar to those obtained under dry conditions. While non-metals suitable for striking plates are durable, these materials generally do not provide a durable roughened, grooved, or textured striking surface such as provided by conventional clubs and that is needed to maintain club performance under various playing conditions. Accordingly, improved striking plates, striking surfaces, and golf clubs that include such striking plates and surfaces and associated methods are needed.

SUMMARY

Some disclosed examples pertain to composite articles, and in particular a composite face plate for a golf club-head, and methods for making the same. In certain embodiments, a composite face plate for a club-head is formed with a cross-sectional profile having a varying thickness. The face plate comprises a lay-up of multiple, composite prepreg plies. The face plate can include additional components, such as an outer polymeric or metal layer (also referred to as a cap) covering the outer surface of the lay-up and forming the striking surface of the face plate. In other embodiments, the outer surface of the lay-up can be the striking surface that contacts a golf ball upon impact with the face plate.

In order to vary the thickness of the lay-up, some of the prepreg plies comprise elongated strips of prepreg material arranged in a cross-cross, overlapping pattern so as to add thickness to the composite lay-up in one or more regions where the strips overlap each other. The strips of prepreg plies can be arranged relative to each other in a predetermined manner to achieve a desired cross-sectional profile for the face plate. For example, in one embodiment, the strips can be arranged in one or more clusters having a central region where the strips overlap each other. The lay-up has a projection or bump formed by the central overlapping region of the strips and desirably centered on the sweet spot of the face plate. A relatively thinner peripheral portion of the lay-up surrounds the projection. In another embodiment, the lay-up can include strips of prepreg plies that are arranged to form an annular projection surrounding a relatively thinner central region of the face plate, thereby forming a cross-sectional profile that is reminiscent of a "volcano."

The strips of prepreg material desirably extend continuously across the finished composite part; that is, the ends of the strips are at the peripheral edge of the finished composite part. In this manner, the longitudinally extending reinforcing fibers of the strips also extend continuously across the finished composite part such that the ends of the fibers are at the periphery of the part. In addition, the lay-up can initially be formed as an "oversized" part in which the reinforcing fibers of the prepreg material extend into a peripheral sacrificial portion of the lay-up. Consequently, the curing process for the lay-up can be controlled to shift defects into the sacrificial portion of the lay-up, which subsequently can be removed to provide a finished part with little or no defects. Moreover, the durability of the finished part is increased because the free ends of the fibers are at the periphery of the finished part, away from the impact zone.

The sacrificial portion desirably is trimmed from the lay-up using water-jet cutting. In water-jet cutting, the cutting force is applied in a direction perpendicular to the prepreg plies (in a direction normal to the front and rear surfaces of the lay-up), which minimizes damage to the reinforcing fibers.

In one representative embodiment, a golf club-head comprises a body having a crown, a heel, a toe, and a sole, and defining a front opening. The head also includes a variable-thickness face insert closing the front opening of the body. The insert comprises a lay-up of multiple, composite prepreg plies, wherein at least a portion of the plies comprise a plurality of elongated prepreg strips arranged in a criss-cross pattern defining an overlapping region where the strips overlap each other. The lay-up has a first thickness at a location spaced from the overlapping region and a second thickness at the overlapping region, the second thickness being greater than the first thickness.

In another representative embodiment, a golf club-head comprises a body having a crown, a heel, a toe, and a sole, and defining a front opening. The head also includes a variable-thickness face insert closing the front opening of the body. The insert comprises a lay-up of multiple, composite prepreg plies, the lay-up having a front surface, a peripheral edge surrounding the front surface, and a width. At least a portion of the plies comprise elongated strips that are narrower than the width of the lay-up and extend continuously across the front surface. The strips are arranged within the lay-up so as to define a cross-sectional profile having a varying thickness.

In another representative embodiment, a composite face plate for a club-head of a golf club comprises a composite lay-up comprising multiple prepreg layers, each prepreg layer comprising at least one resin-impregnated layer of longitudinally extending fibers at a respective orientation. The lay-up has an outer peripheral edge defining an overall size and shape of the lay-up. At least a portion of the layers comprise a plurality of composite panels, each panel comprising a set of one or more prepreg layers, each prepreg layer in the panels having a size and shape that is the same as the overall size and shape of the lay-up. Another portion of the layers comprise a plurality of sets of elongated strips, the sets of strips being interspersed between the panels within the lay-up. The strips extend continuously from respective first locations on the peripheral edge to respective second locations on the peripheral edge and define one or more areas of increased thickness of the lay-up where the strips overlap within the lay-up.

In another representative embodiment, a method for making a composite face plate for a club-head of a golf club comprises forming a lay-up of multiple prepreg composite plies, a portion of the plies comprising elongated strips arranged in a criss-cross pattern defining one or more areas of increased thickness in the lay-up where one or more of the strips overlap each other. The method can further include at least partially curing the lay-up, and shaping the at least partially cured lay-up to form a part having specified dimensions and shape for use as a face plate or part of a face plate for a club-head.

In still another representative embodiment, a method for making a composite face plate for a club-head of a golf club comprises forming a lay-up of multiple prepreg plies, each prepreg ply comprising at least one layer of reinforcing fibers impregnated with a resin. The method can further include at least partially curing the lay-up, and water-jet cutting the at least partially cured lay-up to form a composite part having specified dimensions and shape for use as a face plate or part of a face plate in a club-head.

In some examples, golf club heads comprise a club body and a striking plate secured to the club body. The striking plate includes a face plate and a cover plate secured to the face plate and defining a striking surface, wherein the striking surface includes a plurality of scoreline indentations. In some examples, an adhesive layer secures the cover plate to the face plate. In other alternative embodiments, the scoreline indentations are at least partially filled with a pigment selected to contrast with an appearance of an impact area of the striking surface and the cover plate is metallic and has a thickness between about 0.25 mm and 0.35 mm. In further examples, the scoreline indentations are between about 0.05 and 0.09 mm deep. In other representative examples, a ratio of a scoreline indentation width to a cover plate thickness is between about 2.5 and 3.5, and the face plate is formed of a titanium alloy. In some examples, the scoreline indentations include transition regions having radii of between about 0.2 mm and 0.6 mm, and the cover plate includes a rim configured to extend around a perimeter of the face plate. According to some embodiments, the face plate is a composite face plate and the club body is a wood-type club body.

Cover plates for a golf club face plate comprise a titanium alloy sheet having bulge and roll curvatures, and including a plurality of scoreline indentations. A scoreline indentation depth D is between about 0.05 mm and 0.12 mm, and a titanium alloy sheet thickness T is between about 0.20 mm and 0.40 mm.

In further examples, golf club heads comprise a club body and a striking plate secured to the club body. The striking plate includes a metallic cover having a plurality of impact resistant scoreline indentations situated on a striking surface. In some examples, the metallic cover is between about 0.2 mm and 1.0 mm thick and the scoreline indentations have depths between about 0.1 mm and 0.02 mm. In further examples, the scoreline indentations have a depth D and the metallic cover has a thickness T such that a ratio D/T is between about 0.15 and 0.30 or between about 0.20 and 0.25. In additional examples, the face plate is a variable thickness face plate.

Methods comprise selecting a metallic cover sheet and trimming the metallic cover sheet so as to conform to a golf club face plate. The metallic cover sheet provides a striking surface for a golf club. A plurality of scoreline indentations are defined in the striking surface, wherein the metallic cover sheet has a thickness T between about 0.1 mm and 0.5 mm, and the scoreline indentations have a depth D such that a ratio D/T is between about 0.1 and 0.4. In additional examples, a rim is formed on the cover sheet and is configured to cover a perimeter of the face plate. In typical examples, the metallic sheet is a titanium alloy sheet and is trimmed after formation of the scoreline indentations. In some examples, the scoreline indentations are formed in an impact area of the striking surface or outside of an impact area of the striking surface.

According to some examples, golf club heads (wood-type or iron-type) comprise a club body and a striking plate secured to the club body. The striking plate includes a composite face plate having a front surface and a polymer cover layer secured to the front surface of the face plate, the polymer cover layer having a textured striking surface. In some embodiments, a thickness of the cover layer is between about 0.1 mm and about 2.0 mm or about 0.2 mm and 1.2 mm, or the thickness of the cover layer is about 0.4 mm. In further examples, the striking face of the composite face plate has an effective Shore D hardness of at least about 75, 80, or 85. In additional representative examples, the textured striking surface has one or more of a mean surface roughness between about 1 µm and 10 µm, a mean surface feature frequency of at least about 2/mm, or a surface profile kurtosis greater than about 1.5, 1.75, or 2.0. In additional embodiments, the textured striking surface has a mean surface roughness of less than about 4.5 µm, a mean surface feature frequency of at least about 3/mm, and a surface profile kurtosis greater than about 2 as measured in a top-to-bottom direction, a toe-to-heel direction, or along both directions. In some examples, the striking surface is textured along a top-to-bottom direction or a toe-to-heel direction only. In other examples, the striking surface is textured along an axis that is tilted with respect to a toe-to-heel and a top-to-bottom direction.

Methods comprise providing a face plate for a golf club and a cover layer for a front surface of the face plate. A striking surface of the cover layer is patterned so as to provide a roughened or textured striking surface. According to some examples, the roughened striking surface is patterned to include a periodic array of surface features that provide a mean roughness less than about 5 µm and a mean surface feature frequency along at least one axis substantially parallel to the striking surface of at least 2/mm. In other examples, the striking surface of the cover layer is patterned with a mold. In further examples, the striking surface is patterned by pressing a fabric against the cover layer, and subsequently removing the fabric. In a representative example, the cover layer is formed of a thermoplastic and the fabric is applied as the cover layer is formed.

Golf club heads comprise a face plate having a front surface and a control layer situated on the front surface of the face plate, wherein the control layer has a striking surface having a surface roughness configured to provide a ball spin of about 2500 rpm, 3000 rpm, or 3500 rpm under wet conditions. In some examples, the control layer is a polymer layer. In further examples, the control layer is a polymer layer having a thickness of between about 0.3 mm and 0.5 mm, and the surface roughness of the striking surface is substantially periodic along at least one axis that is substantially parallel to the striking surface. In a representative examples, the striking surface of the face plate has a Shore D hardness of at least about 75, 80, or more preferably, at least about 85. The polymer layer can be a thermoset or thermoplastic material. In representative examples, the polymer layer is a SURLYN ionomer or similar material, or a urethane, preferably a non-yellowing urethane.

The foregoing and other objects, features, and advantages of the invention will become more apparent from the following detailed description, which proceeds with reference to the accompanying figures.

BRIEF DESCRIPTION OF THE DRAWINGS

FIG. 8A-8C are plan views illustrating the manner in which clusters of prepreg strips can be oriented at different rotational positions relative to each other in a composite lay-up to create an angular offset between the strips of adjacent clusters.

FIGS. 32-34 illustrate a striking plate that includes a face plate and a cover layer having a striking surface with a patterned roughness.

FIGS. 40-42 illustrate another representative striking plate that includes a cover layer having a roughened striking surface.

DETAILED DESCRIPTION

This disclosure is set forth in the context of representative embodiments that are not intended to be limiting in any way.

In the following description, certain terms may be used such as "up," "down,", "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

As used herein, the singular forms "a," "an," and "the" refer to one or more than one, unless the context clearly dictates otherwise.

As used herein, the term "includes" means "comprises." For example, a device that includes or comprises A and B contains A and B but may optionally contain C or other components other than A and B. A device that includes or comprises A or B may contain A or B or A and B, and optionally one or more other components such as C.

As used herein, the term "composite" or "composite materials" means a fiber-reinforced polymeric material.

Figure 1:
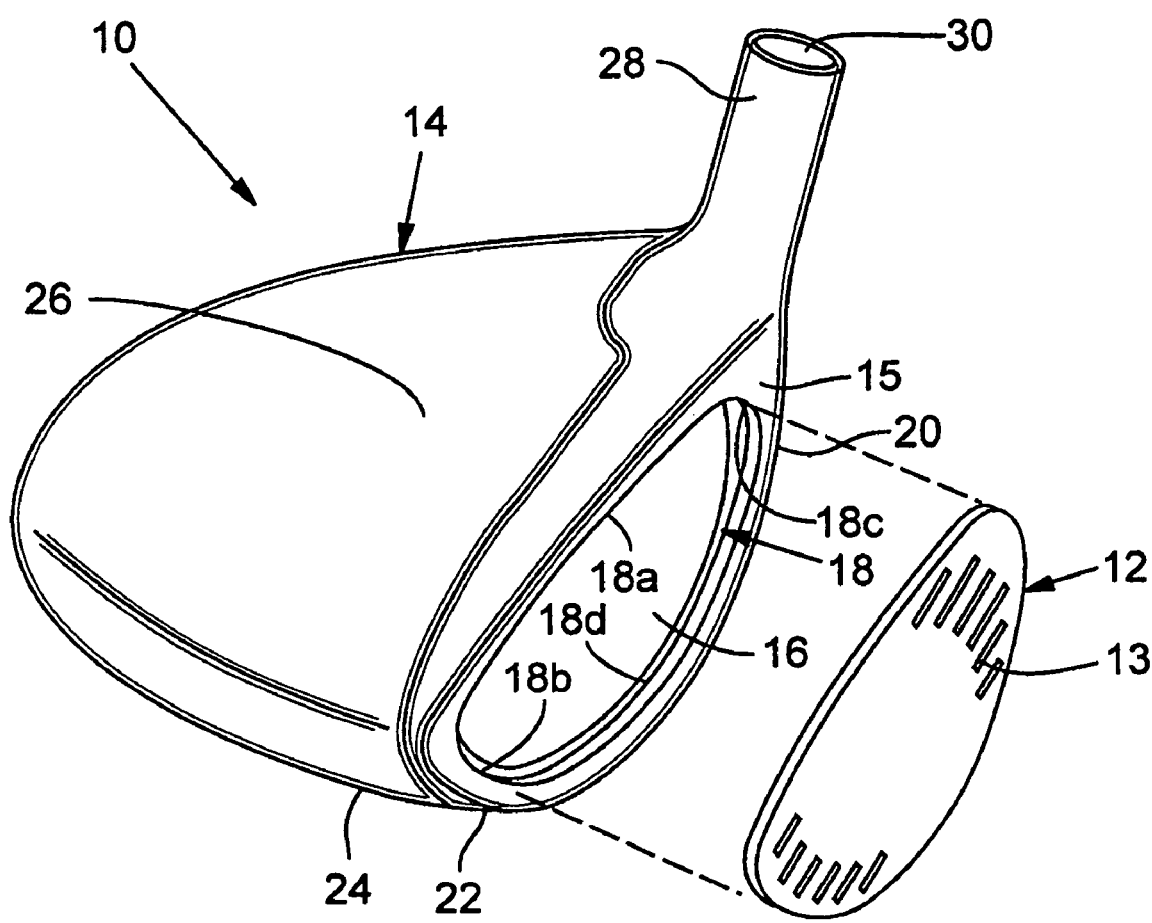
FIG. 1 is a perspective view of a "metal-wood" club-head, showing certain general features pertinent to the instant disclosure.

The main features of an exemplary hollow "metal-wood" club-head 10 are depicted in FIG. 1. The club-head 10 comprises a face plate, strike plate, or striking plate 12 and a body 14. The face plate 12 typically is convex, and has an external ("striking") surface (face) 13. The body 14 defines a front opening 16. A face support 18 is disposed about the front opening 16 for positioning and holding the face plate 12 to the body 14. The body 14 also has a heel 20, a toe 22, a sole 24, a top or crown 26, and a hosel 28. Around the front opening 16 is a "transition zone" 15 that extends along the respective forward edges of the heel 20, the toe 22, the sole 24, and the crown 26. The transition zone 15 effectively is a transition from the body 14 to the face plate 12. The face support 18 can comprise a lip or rim that extends around the front opening 16 and is released relative to the transition zone 15 as shown. The hosel 28 defines an opening 30 that receives a distal end of a shaft (not shown). The opening 16 receives the face plate 12, which rests upon and is bonded to the face support 18 and transition zone 15, thereby enclosing the front opening 16. The transition zone 15 can include a sole-lip region 18d, a crown-lip region 18a, a heel-lip region 18c, and a toe-lip region 18b. These portions can be contiguous, as shown, or can be discontinuous, with spaces between them.

In a club-head according to one embodiment, at least a portion of the face plate 12 is made of a composite including multiple plies or layers of a fibrous material (e.g., graphite, or carbon, fiber) embedded in a cured resin (e.g., epoxy). For example, the face plate 12 can comprise a composite component (e.g., component 40 shown in FIGS. 2-4) that has an outer polymeric layer forming the striking surface 13. Examples of suitable polymers that can be used to form the outer coating, or cap, are described in detail below. Alternatively, the face plate 12 can have an outer metallic cap forming the external striking surface 13 of the face plate, as described in U.S. Pat. No. 7,267,620, which is incorporated herein by reference.

An exemplary thickness range of the composite portion of the face plate is 7.0 mm or less. The composite desirably is configured to have a relatively consistent distribution of reinforcement fibers across a cross-section of its thickness to facilitate efficient distribution of impact forces and overall durability. In addition, the thickness of the face plate 12 can be varied in certain areas to achieve different performance characteristics and/or improve the durability of the club-head. The face plate 12 can be formed with any of various cross-sectional profiles, depending on the club-head's desired durability and overall performance, by selectively placing multiple strips of composite material in a predetermined manner in a composite lay-up to form a desired profile.

Attaching the face plate 12 to the support 18 of the club-head body 14 may be achieved using an appropriate adhesive (typically an epoxy adhesive or a film adhesive). To prevent peel and delamination failure at the junction of an all-composite face plate with the body of the club-head, the composite face plate can be recessed from or can be substantially flush with the plane of the forward surface of the metal body at the junction. Desirably, the face plate is sufficiently recessed so that the ends of the reinforcing fibers in the composite component are not exposed.

The composite portion of the face plate is made as a lay-up of multiple prepreg plies. For the plies the fiber reinforcement and resin are selected in view of the club-head's desired durability and overall performance. In order to vary the thickness of the lay-up, some of the prepreg plies comprise elongated strips of prepreg material arranged in one or more sets of strips. The strips in each set are arranged in a cross-cross, overlapping pattern so as to add thickness to the composite lay-up in the region where the strips overlap each other, as further described in greater detail below. The strips desirably extend continuously across the finished composite part; that is, the ends of the strips are at the peripheral edge of the finished composite part. In this manner, the longitudinally extending reinforcing fibers of the strips also can extend continuously across the finished composite part such that the ends of the fibers are at the periphery of the part. Consequently, during the curing process, defects can be shifted toward a peripheral sacrificial portion of the composite lay-up, which sacrificial portion subsequently can be removed to provide a finished part with little or no defects. Moreover, the durability of the finished part is increased because the free ends of the fibers are at the periphery of the finished part, away from the impact zone.

In tests involving certain club-head configurations, composite portions formed of prepreg plies having a relatively low fiber areal weight (FAW) have been found to provide superior attributes in several areas, such as impact resistance, durability, and overall club performance. (FAW is the weight of the fiber portion of a given quantity of prepreg, in units of $g/m^2$.) FAW values below 100 $g/m^2$, and more desirably below 70 $g/m^2$, can be particularly effective. A particularly suitable fibrous material for use in making prepreg plies is carbon fiber, as noted. More than one fibrous material can be used. In other embodiments, however, prepreg plies having FAW values above 100 $g/m^2$ may be used.

In particular embodiments, multiple low-FAW prepreg plies can be stacked and still have a relatively uniform distribution of fiber across the thickness of the stacked plies. In contrast, at comparable resin-content (R/C, in units of percent) levels, stacked plies of prepreg materials having a higher FAW tend to have more significant resin-rich regions, particularly at the interfaces of adjacent plies, than stacked plies of low-FAW materials. Resin-rich regions tend to reduce the efficacy of the fiber reinforcement, particularly since the force resulting from golf-ball impact is generally transverse to the orientation of the fibers of the fiber reinforcement.

Figure 4:
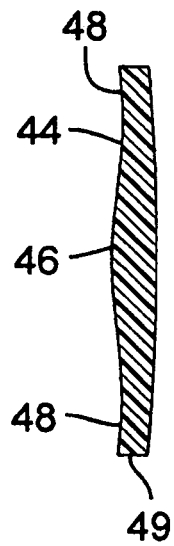
FIG. 4 is a cross-sectional view taken along line 4-4 of FIG. 2.
Figure 2:
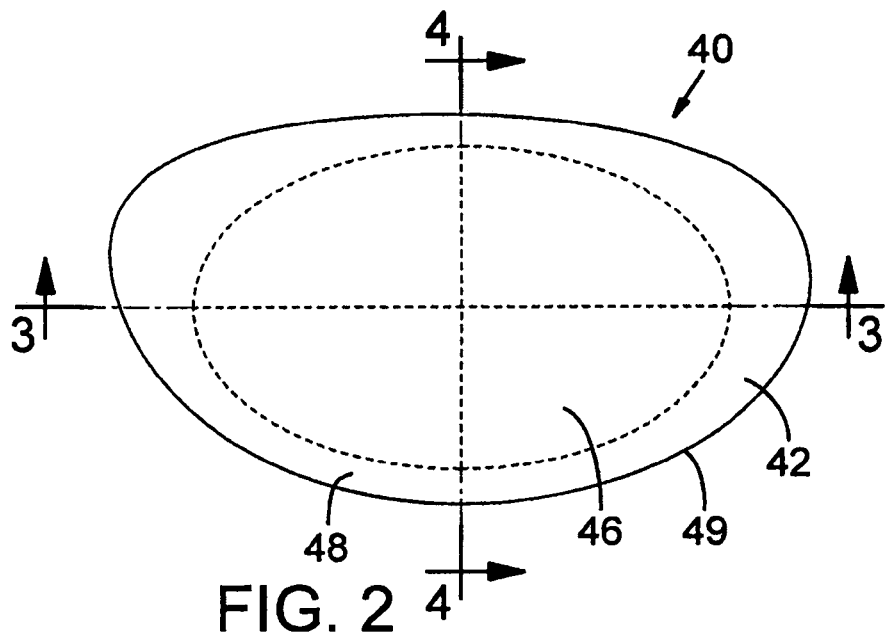
FIG. 2 is a front elevation view of one embodiment of a net-shape composite component used to form the strike plate of a club-head, such as the club-head shown in FIG. 1.
Figure 3:
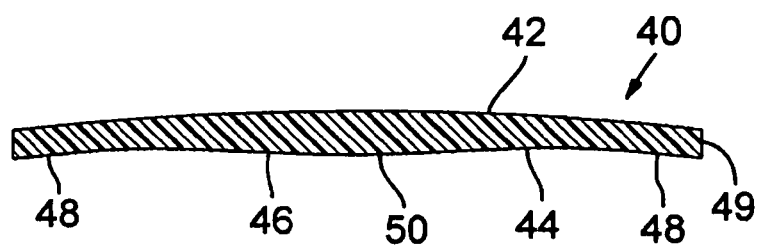
FIG. 3 is a cross-sectional view taken along line 3-3 of FIG. 2.

FIGS. 2-4 show an exemplary embodiment of a finished component 40 that is fabricated from a plurality of prepreg plies or layers and has a desired shape and size for use as a face plate for a club-head or as part of a face plate for a clubhead. The composite part 40 has a front surface 42 and a rear surface 44. In this example the composite part has an overall convex shape, a central region 46 of increased thickness, and a peripheral region 48 having a relatively reduced thickness extending around the central region. The central region 46 in the illustrated example is in the form of a projection or cone on the rear surface having its thickest portion at a central point 50 (FIG. 3) and gradually tapering away from the point in all directions toward the peripheral region 48. The central point 50 represents the approximate center of the "sweet spot" (optimal strike zone) of the face plate 12, but not necessarily the geometric center of the face plate. The thicker central region 46 adds rigidity to the central area of the face plate 12, which effectively provides a more consistent deflection across the face plate. In certain embodiments, the central region 46 has a thickness of about 5 mm to about 7 mm and the peripheral region 48 has a thickness of about 4 mm to about 5 mm.

Figure 5:
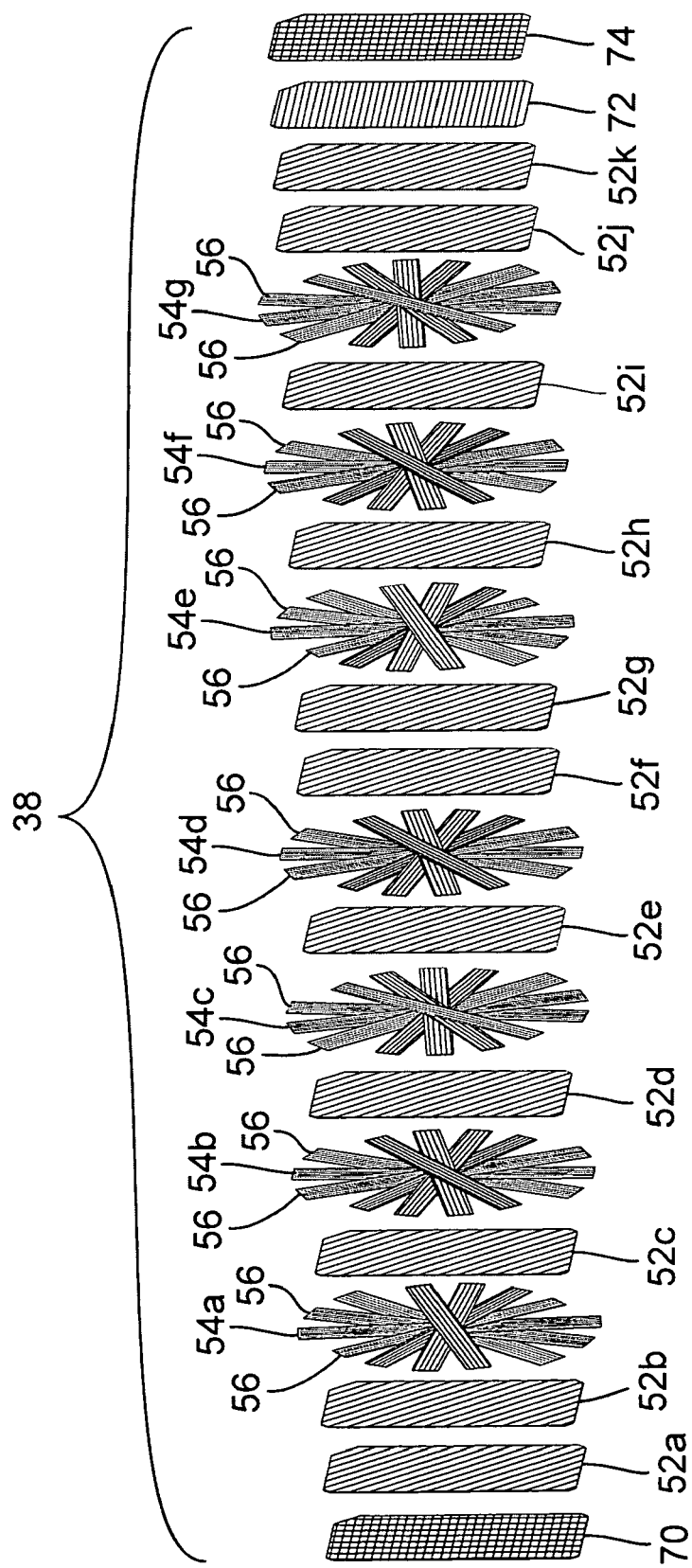
FIG. 5 is an exploded view of one embodiment of a composite lay-up from which the component shown in FIG. 2 can be formed.
Figure 9:
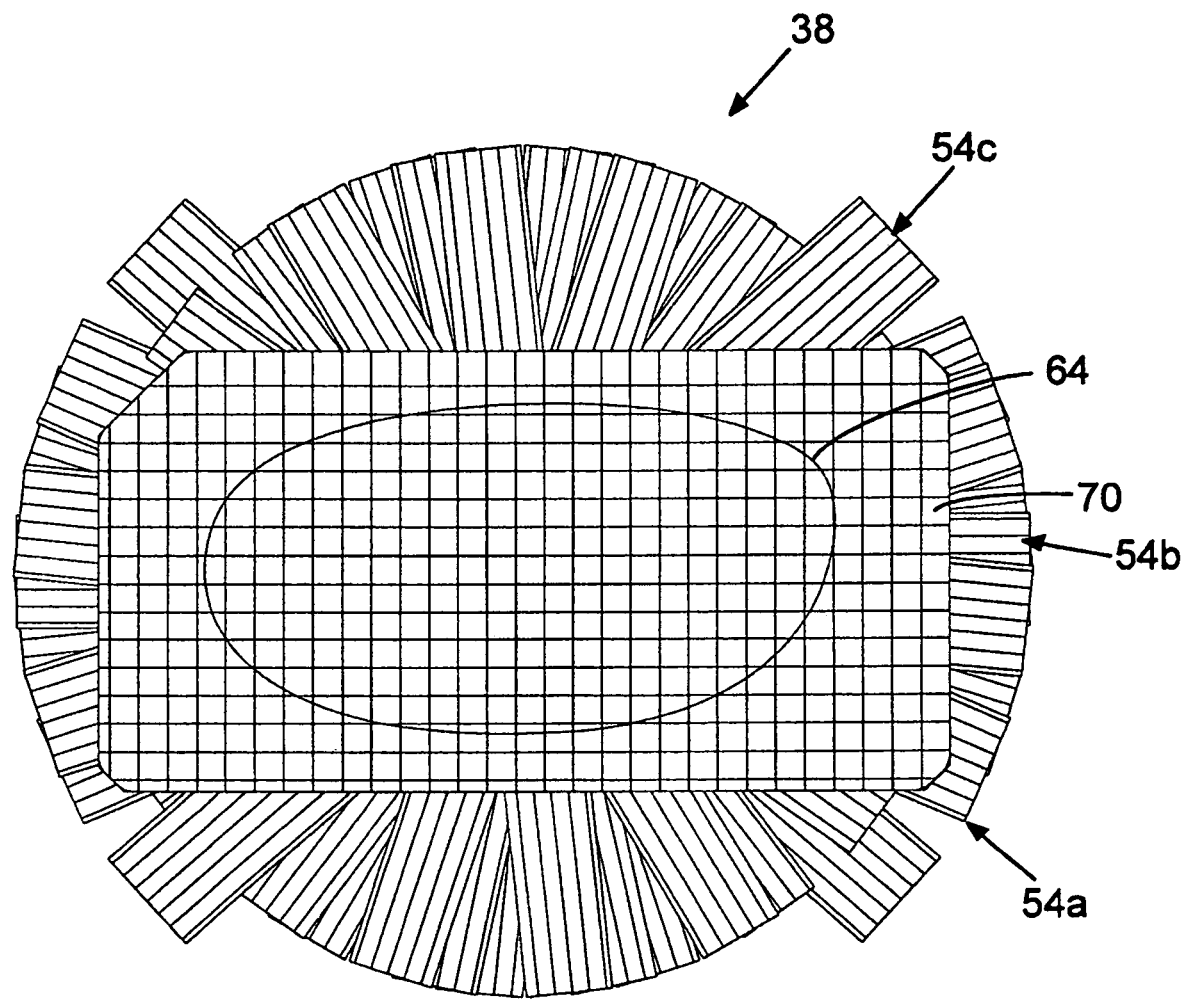
FIG. 9 is a top plan view of the composite lay-up shown in FIG. 5.

In certain embodiments, the composite component 40 is fabricated by first forming an oversized lay-up of multiple prepreg plies, and then machining a sacrificial portion from the cured lay-up to form the finished part 40. FIG. 9 is a top plan view of one example of a lay-up 38 from which the composite component 40 can be formed. The line 64 in FIG. 9 represents the outline of the component 40. Once cured, the portion surrounding the line 64 can be removed to form the component 40. FIG. 5 is an exploded view of the lay-up 38. In the lay-up, each prepreg ply desirably has a prescribed fiber orientation, and the plies are stacked in a prescribed order with respect to fiber orientation.

As shown in FIG. 5, the illustrated lay-up 38 is comprised of a plurality of sets, or unit-groups, 52a-52k of one or more prepreg plies of substantially uniform thickness and one or more sets, or unit-groups, 54a-54g of individual plies in the form of elongated strips 56. For purposes of description, each set 52a-52k of one or more plies can be referred to as a composite "panel" and each set 54a-54g can be referred to as a "cluster" of elongated strips. The clusters 54a-54g of elongated strips 56 are interposed between the panels 52a-52k and serve to increase the thickness of the finished part 40 at its central region 46 (FIG. 2). Each panel 52a-52k comprises one or more individual prepreg plies having a desired fiber orientation. The individual plies forming each panel 52a-52k desirably are of sufficient size and shape to form a cured lay-up from which the smaller finished component 40 can be formed substantially free of defects. The clusters 54a-54g of strips 56 desirably are individually positioned between and sandwiched by two adjacent panels (i.e., the panels 52a-52k separate the clusters 54a-54g of strips from each other) to facilitate adhesion between the many layers of prepreg material and provide an efficient distribution of fibers across a cross-section of the part.

In particular embodiments, the number of panels 52a-52k can range from 9 to 14 (with eleven panels 52a-52k being used in the illustrated embodiment) and the number of clusters 54a-54g can range from 1 to 12 (with seven clusters 54a-54g being used in the illustrated embodiment). However, in alternative embodiments, the number of panels and clusters can be varied depending on the desired profile and thickness of the part.

The prepreg plies used to form the panels 52a-52k and the clusters 54a-54g desirably comprise carbon fibers impregnated with a suitable resin, such as epoxy. An example carbon fiber is "34-700" carbon fiber (available from Grafil, Sacramento, Calif.), having a tensile modulus of 234 Gpa (34 Msi) and a tensile strength of 4500 Mpa (650 Ksi). Another Grafil fiber that can be used is "TR50S" carbon fiber, which has a tensile modulus of 240 Gpa (35 Msi) and a tensile strength of 4900 Mpa (710 ksi). Suitable epoxy resins are types "301" and "350" (available from Newport Adhesives and Composites, Irvine, Calif.). An exemplary resin content (R/C) is 40%.

Figure 6:
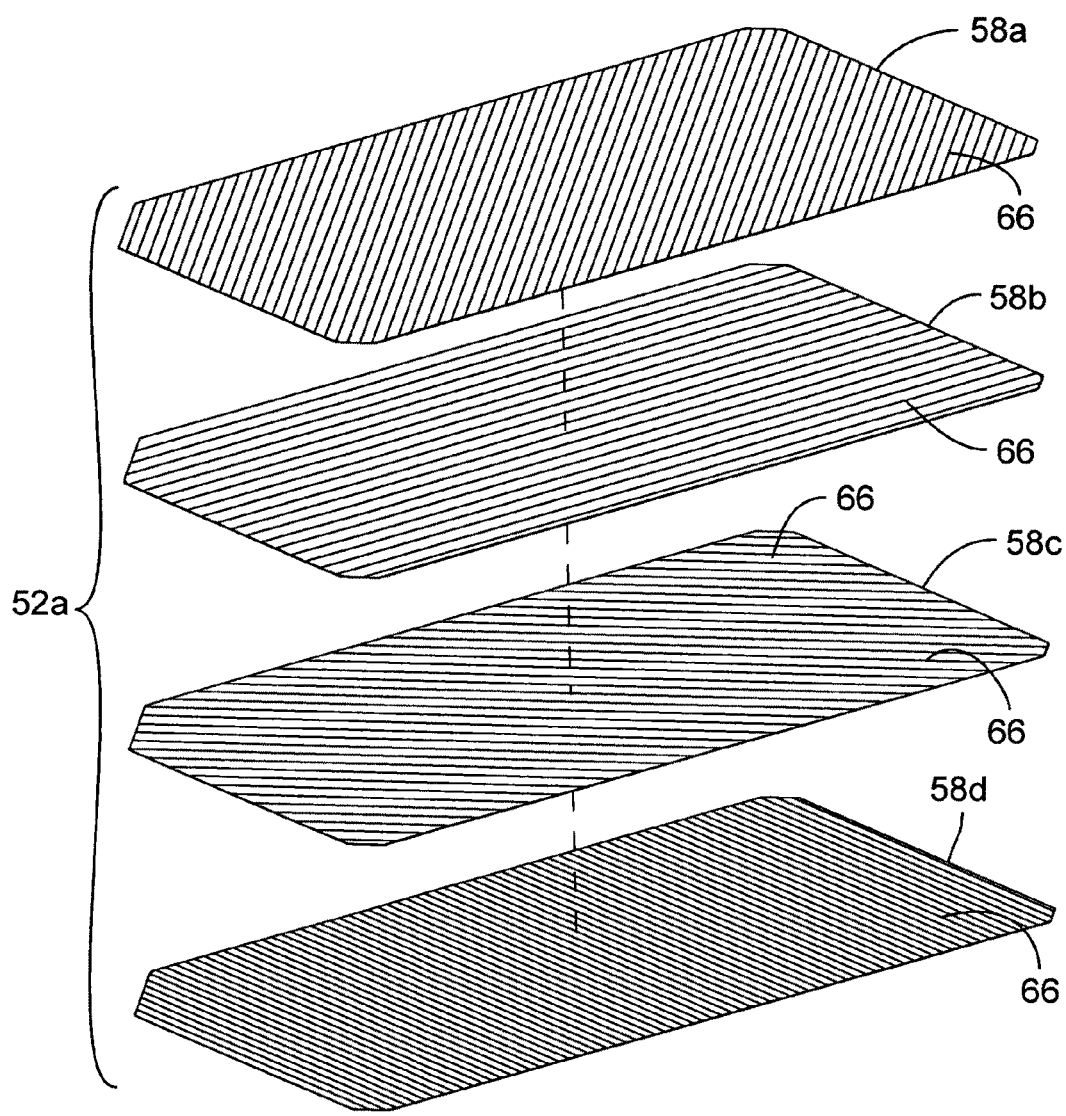
FIG. 6 is an exploded view of a group of prepreg plies of differing fiber orientations that are stacked to form a "quasi-isotropic" composite panel that can be used in the lay-up illustrated in FIG. 5.

FIG. 6 is an exploded view of the first panel 52a. For convenience of reference, the fiber orientation (indicated by lines 66) of each ply is measured from a horizontal axis of the club-head's face plane to a line that is substantially parallel with the fibers in the ply. As shown in FIG. 6, the panel 52a in the illustrated example comprises a first ply 58a having fibers oriented at +45 degrees, a second ply 58b having fibers oriented at 0 degrees, a third ply 58c having fibers oriented at −45 degrees, and a fourth ply 58d having fibers oriented at 90 degrees. The panel 52a of plies 58a-58d thus form a "quasi-isotropic" panel of prepreg material. The remaining panels 52b-52k can have the same number of prepreg plies and fiber orientation as set 52a.

The lay-up illustrated in FIG. 5 can further include an "outermost" fiberglass ply 70 adjacent the first panel 52a, a single carbon-fiber ply 72 adjacent the eleventh and last panel 52k, and an "innermost" fiberglass ply 74 adjacent the single ply 72. The single ply can have a fiber orientation of 90 degrees as shown. The fiberglass plies 70, 74 can have fibers oriented at 0 degrees and 90 degrees. The fiberglass plies 70, 74 are essentially provided as sacrificial layers that protect the carbon-fiber plies when the cured lay-up is subjected to surface finishing such as sand blasting to smooth the outer surfaces of the part.

Figure 7:
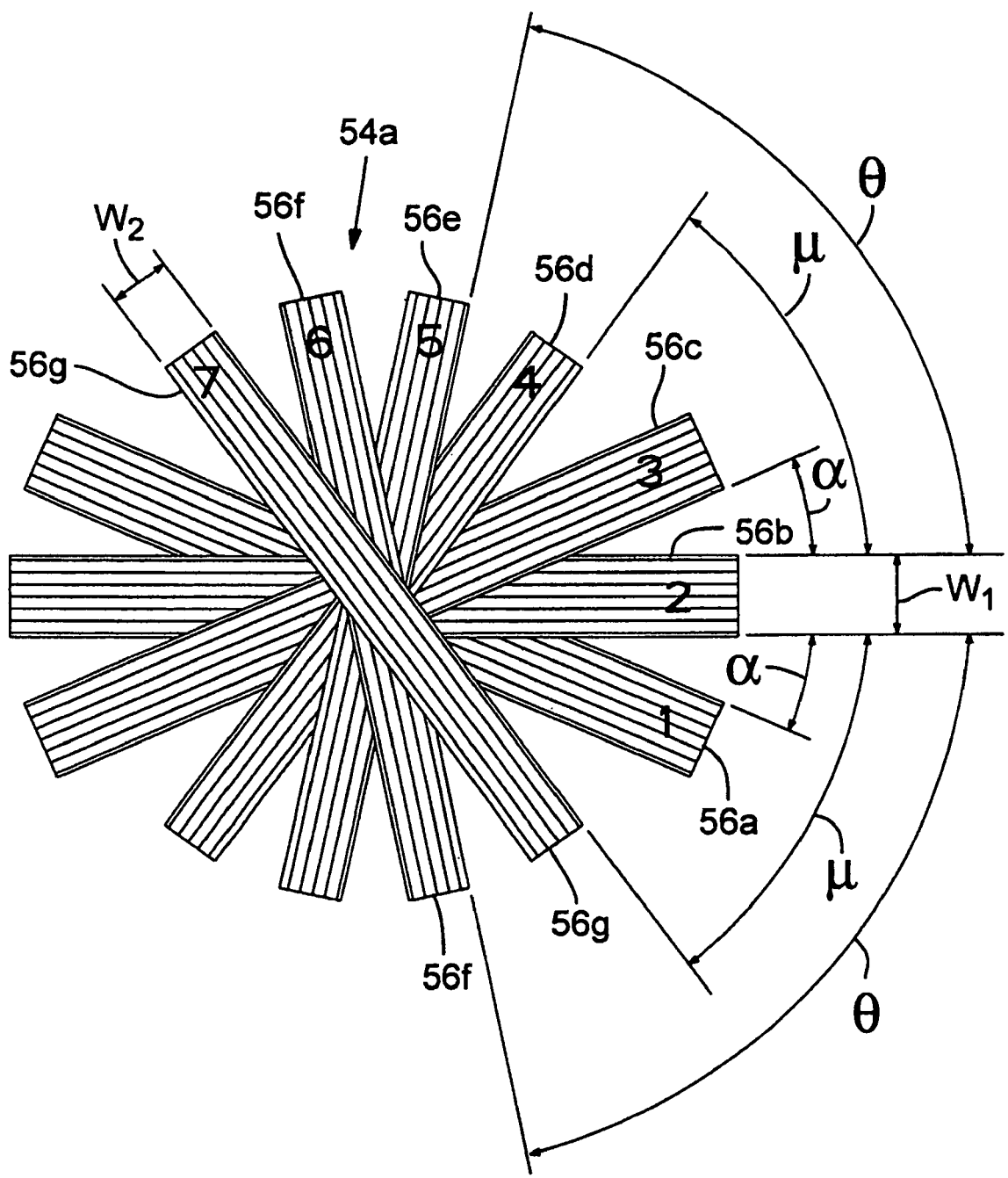
FIG. 7 is a plan view of a group or cluster of elongated prepreg strips that can be used in the lay-up illustrated in FIG. 5.

FIG. 7 is an enlarged plan view of the first cluster 54a of elongated prepreg strips which are arranged with respect to each other so that the cluster has a variable thickness. The cluster 54a in the illustrated example includes a first strip 56a, a second strip 56b, a third strip 56c, a fourth strip 56d, a fifth strip 56e, a sixth strip 56f, and a seventh strip 56g. The strips are stacked in a criss-cross pattern such that the strips overlap each other to define an overlapping region 60 and the ends of each strip are angularly spaced from adjacent ends of another strip. The cluster 54a is therefore thicker at the overlapping region 60 than it is at the ends of the strips. The strips can have the same or different lengths and widths, which can be varied depending on the desired overall shape of the composite part 40, although each strip desirably is long enough to extend continuously across the finished part 40 that is cut or otherwise machined from the oversized lay-up.

The strips 56a-56g in the illustrated embodiment are of equal length and are arranged such that the geometric center point 62 of the cluster corresponds to the center of each strip. The first three strips 56a-56c in this example have a width $w_1$ that is greater than the width $w_2$ of the last four strips 56d-56g. The strips define an angle $\alpha$ between the "horizontal" edges of the second strip 56b and the adjacent edges of strips 56a and 56c, an angle $\mu$ between the edges of strip 56b and the closest edges of strips 56d and 56g, and an angle $\theta$ between the edges of strip 56b and the closest edges of strips 56e and 56f. In a working embodiment, the width $w_1$ is about 20 mm, the width $w_2$ is about 15 mm, the angle $\alpha$ is about 24 degrees, the angle $\mu$ is about 54 degrees, and the angle $\theta$ is about 78 degrees.

Referring again to FIG. 5, each cluster 54a-54g desirably is rotated slightly or angularly offset with respect to an adjacent cluster so that the end portions of each strip in a cluster are not aligned with the end portions of the strips of an adjacent cluster. In this manner, the clusters can be arranged relative to each other in the lay-up to provide a substantially uniform thickness in the peripheral region 48 of the composite part (FIG. 3). In the illustrated embodiment, for example, the first cluster 54a has an orientation of −18 degrees, meaning that the "upper" edge of the second strip 56b extends at a −18 degree angle with respect to the "upper" horizontal edge of the adjacent unit-group 52c (as best shown in FIG. 8A). The next successive cluster 54b has an orientation of 0 degrees, meaning that the second strip 56b is parallel to the "upper" horizontal edge of the adjacent unit-group 52d (as best shown in FIG. 8B). The next successive cluster 54c has an orientation of +18 degrees, meaning that the "lower" edge of the respective second strip 56b of cluster 54c extends at a +18 degree angle with respect to the "lower" edge of the adjacent unit-group 52e. Clusters 54d, 54e, 54f, and 54g (FIG. 5) can have an orientation of 0 degrees, −18 degrees, 0 degrees, and +18 degrees, respectively.

When stacked in the lay-up, the overlapping regions 60 of the clusters are aligned in the direction of the thickness of the lay-up to increase the thickness of the central region 46 of the part 40 (FIG. 3), while the "spokes" (the strips 56a-56g) are "fanned" or angularly spaced from each other within each cluster and with respect to spokes in adjacent clusters. Prior to curing/molding, the lay-up has a cross-sectional profile that is similar to the finished part 40 (FIGS. 2-4) except that the lay-up is flat, that is, the lay-up does not have an overall convex shape. Thus, in profile, the rear surface of the lay-up has a central region of increased thickness and gradually tapers to a relatively thinner peripheral region of substantially uniform thickness surrounding the central region. In a working embodiment, the lay-up has a thickness of about 5 mm at the center of the central region and a thickness of about 3 mm at the peripheral region. A greater or fewer number of panels and/or clusters of strips can be used to vary the thickness at the central region and/or peripheral region of the lay-up.

To form the lay-up, according to one specific approach, formation of the panels 52a-52k may be done first by stacking individual precut, prepreg plies 58a-58d of each panel. After the panels are formed, the lay-up is built up by laying the second panel 52b on top of the first panel 52a, and then forming the first cluster 54a on top of the second panel 52b by laying individual strips 56a-56g in the prescribed manner. The remaining panels 52c-52k and clusters 54b-54g are then added to the lay-up in the sequence shown in FIG. 5, followed by the single ply 72. The fiberglass plies 70, 74 can then be added to the front and back of the lay-up.

The fully-formed lay-up can then be subjected to a "debulking" or compaction step (e.g., using a vacuum table) to remove and/or reduce air trapped between plies. The lay-up can then be cured in a mold that is shaped to provide the desired bulge and roll of the face plate. An exemplary curing process is described in detail below. Alternatively, any desired bulge and roll of the face plate may be formed during one or more debulking or compaction steps performed prior to curing. To form the bulge or roll, the debulking step can be performed against a die panel having the final desired bulge and roll. In either case, following curing, the cured lay-up is removed from the mold and machined to form the part 40.

The following aspects desirably are controlled to provide composite components that are capable of withstanding impacts and fatigue loadings normally encountered by a club-head, especially by the face plate of the club-head. These three aspects are: (a) adequate resin content; (b) fiber straightness; and (c) very low porosity in the finished composite. These aspects can be controlled by controlling the flow of resin during curing, particularly in a manner that minimizes entrapment of air in and between the prepreg layers. Air entrapment is difficult to avoid during laying up of prepreg layers. However, air entrapment can be substantially minimized by, according to various embodiments disclosed herein, imparting a slow, steady flow of resin for a defined length of time during the laying-up to purge away at least most of the air that otherwise would become occluded in the lay-up. The resin flow should be sufficiently slow and steady to retain an adequate amount of resin in each layer for adequate inter-layer bonding while preserving the respective orientations of the fibers (at different respective angles) in the layers. Slow and steady resin flow also allows the fibers in each ply to remain straight at their respective orientations, thereby preventing the "wavy fiber" phenomenon. Generally, a wavy fiber has an orientation that varies significantly from its naturally projected direction.

As noted above, the prepreg strips 56 desirably are of sufficient length such that the fibers in the strips extend continuously across the part 40; that is, the ends of each fiber are located at respective locations on the outer peripheral edge 49 of the part 40 (FIGS. 2-4). Similarly, the fibers in the prepreg panels 52a-52k desirably extend continuously across the part between respective locations on the outer peripheral edge 49 of the part. During curing, air bubbles tend to flow along the length of the fibers toward the outer peripheral (sacrificial) portion of the lay-up. By making the strips sufficiently long and the panels larger than the final dimensions of the part 40, the curing process can be controlled to remove substantially all of the entrapped air bubbles from the portion of the lay-up that forms the part 40. The peripheral portion of the lay-up is also where wavy fibers are likely to be formed. Following curing, the peripheral portion of the lay-up is removed to provide a net-shape part (or near net-shape part if further finishing steps are performed) that has a very low porosity as well as straight fibers in each layer of prepreg material.

In working examples, parts have been made without any voids, or entrapped air, and with a single void in one of the prepreg plies of the lay-up (either a strip or a panel-size ply). Parts in which there is a single void having its largest dimension equal to the thickness of a ply (about 0.1 mm) have a void content, or porosity, of about $1.7 \times 10^{-6}$ percent or less by volume.

Figure 10A:
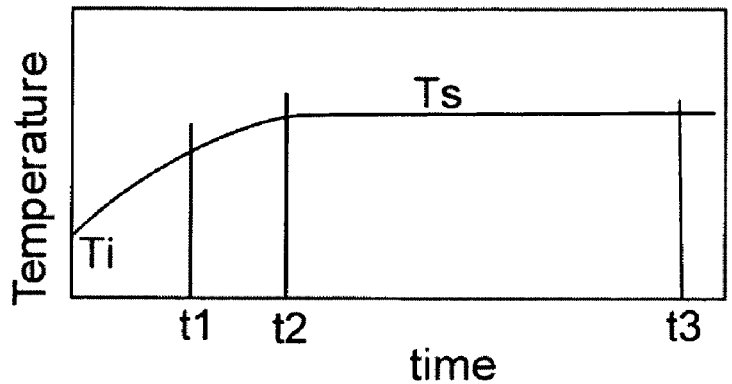
FIGS. 10A-10C are plots of temperature, viscosity, and pressure, respectively, versus time in a representative embodiment of a process for forming composite components.
Figure 10B:
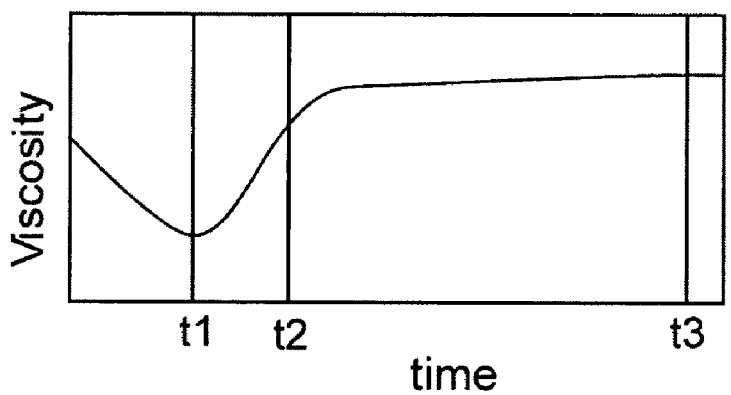
Figure 10C:
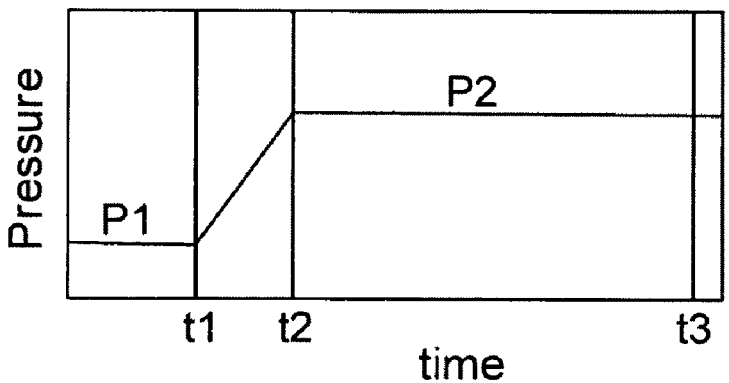

FIGS. 10A-10C depict an embodiment of a process (pressure and temperature as functions of time) in which slow and steady resin flow is performed with minimal resin loss. FIG. 10A shows temperature of the lay-up as a function of time. The lay-up temperature is substantially the same as the tool temperature. The tool is maintained at an initial tool temperature $T_i$, and the uncured prepreg lay-up is placed or formed in the tool at an initial pressure $P_1$ (typically atmospheric pressure). The tool and uncured prepreg is then placed in a hot-press at a tool-set temperature $T_s$, resulting in an increase in the tool temperature (and thus the lay-up temperature) until the tool temperature eventually reaches equilibrium with the set temperature $T_s$ of the hot-press. As the temperature of the tool increases from $T_i$ to $T_s$, the hot-press pressure is kept at $P_1$ for t=0 to t=$t_1$. At t=$t_1$, the hot-press pressure is ramped from $P_1$ to $P_2$ such that, at t=$t_2$, P=$P_2$. Between $T_i$ and $T_s$, the temperature increase of the tool and lay-up is continuous. Exemplary rates of change of temperature and pressure are: $\Delta T \sim 30\text{-}60°$ C./minute up to $t_1$, and $\Delta P \sim 50$ psi/minute from $t_1$ to $t_2$.

As the tool temperature increases from $T_i$ to $T_s$, the viscosity of the resin first decreases to a minimum, at time $t_1$, before the viscosity rises again due to cross-linking of the resin (FIG. 10B). At time $t_1$, resin flows relatively easily. This increased flow poses an increased risk of resin loss, especially if the pressure in the tool is elevated. Elevated tool pressure at this stage also causes other undesirable effects such as a more agitated flow of resin. Hence, tool pressure should be maintained relatively low at and around $t_1$ (see FIG. 10C). After $t_1$, cross-linking of the resin begins and progresses, causing a progressive rise in resin viscosity (FIG. 10B), so tool pressure desirably is gradually increased in the time span from $t_1$ to $t_2$ to allow (and to encourage) adequate and continued (but nevertheless controlled) resin flow. The rate at which pressure is increased should be sufficient to reach maximum pressure $P_2$ slightly before the end of rapid increase in resin viscosity. Again, a desired rate of change is $\Delta P \sim 50$ psi/minute from $t_1$ to $t_2$. At time $t_2$ the resin viscosity desirably is approximately 80% of maximum.

Curing continues after time $t_2$ and follows a schedule of relatively constant temperature $T_s$ and constant pressure $P_2$. Note that resin viscosity exhibits some continued increase (typically to approximately 90% of maximum) during this phase of curing. This curing (also called "pre-cure") ends at time $t_3$ at which the component is deemed to have sufficient rigidity (approximately 90% of maximum) and strength for handling and removal from the tool, although the resin may not yet have reached a "full-cure" state (at which the resin exhibits maximum viscosity). A post-processing step typically follows, in which the components reach a "full cure" in a batch heating mode or other suitable manner.

Thus, important parameters of this specific process are: (a) $T_s$, the tool-set temperature (or typical resin-cure temperature), established according to manufacturer's instructions; (b) $T_i$, the initial tool temperature, usually set at approximately 50% of $T_s$ (in ° F. or ° C.) to allow an adequate time span ($t_2$) between $T_i$ and $T_s$ and to provide manufacturing efficiency; (c) $P_1$, the initial pressure that is generally slightly higher than atmospheric pressure and sufficient to hold the component geometry but not sufficient to "squeeze" resin out, in the range of 20-50 psig for example; (d) $P_2$, the ultimate pressure that is sufficiently high to ensure dimensional accuracy of components, in the range of 200-300 psig for example; (e) $t_1$, which is the time at which the resin exhibits a minimal viscosity, a function of resin properties and usually determined by experiment, for most resins generally in the range of 5-10 minutes after first forming the lay-up; (f) $t_2$, the time of maximum pressure, also a time delay from $t_1$, where resin viscosity increases from minimum to approximately 80% of a maximum viscosity (i.e., viscosity of fully cured resin), appears to be related to the moment when the tool reaches $T_s$; and (g) $t_3$, the time at the end of the pre-cure cycle, at which the components have reached handling strength and resin viscosity is approximately 90% of its maximum.

Figure 11A:
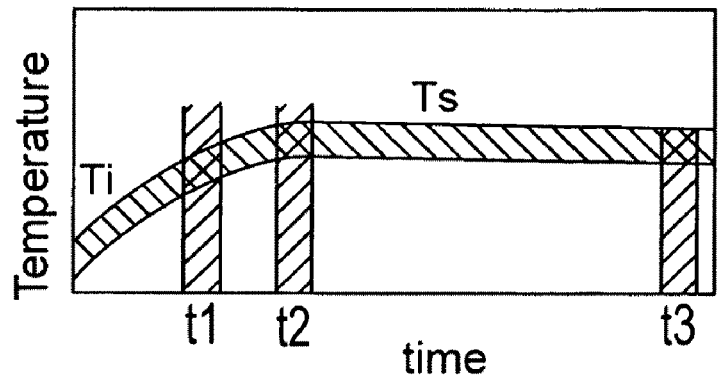
FIGS. 11A-11C are plots of temperature, viscosity, and pressure, respectively, versus time in a representative embodiment of a process in which each of these variables can be within a specified respective range (hatched areas).
Figure 11B:
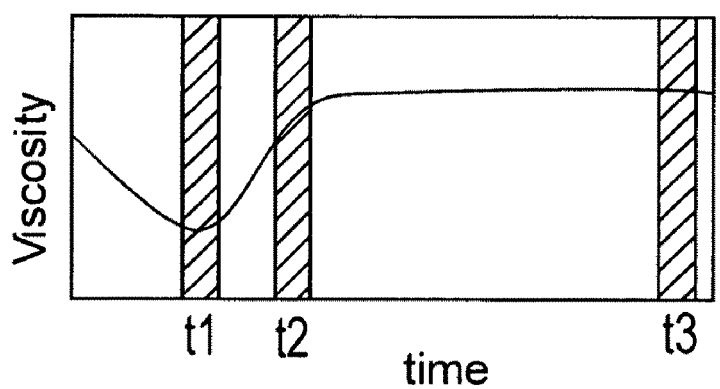
Figure 11C:
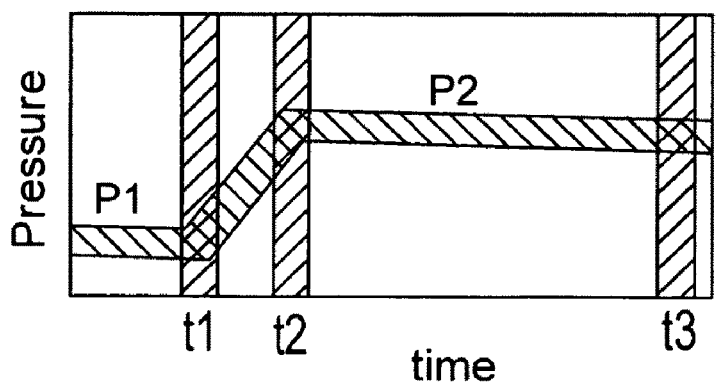

Many variations of this process also can be designed and may work equally as well. Specifically, all seven parameters mentioned above can be expressed in terms of ranges instead of specific quantities. In this sense, the processing parameters can be expressed as follows (see FIGS. 11A-11C):

$T_s$: recommended resin cure temperature±$\Delta T$, where $\Delta T$=20, 50, 75° F.

$T_i$: initial tool temperature (or $T_s/2$)±$\Delta T$.

$P_1$: 0-100 psig±$\Delta P$, where $\Delta P$=5, 10, 15, 25, 35, 50 psi.

$P_2$: 200-500 psig±$\Delta P$.

$t_1$: t (minimum ±$\Delta x$ viscosity)±$\Delta t$, where $\Delta x$=1, 2, 5, 10, 25% and $\Delta t$=1, 2, 5, 10 min.

$t_2$: t (80%±$\Delta x$ maximum viscosity)±$\Delta t$.

$t_3$: t (90%±$\Delta x$ maximum viscosity)±$\Delta t$.

After reaching full-cure, the components are subjected to manufacturing techniques (machining, forming, etc.) that achieve the specified final dimensions, size, contours, etc., of the components for use as face plates on club-heads. Conventional CNC trimming can be used to remove the sacrificial portion of the fully-cured lay-up (e.g., the portion surrounding line 64 in FIG. 9). However, because the tool applies a lateral cutting force to the part (against the peripheral edge of the part), it has been found that such trimming can pull fibers or portions thereof out of their plies and/or induce horizontal cracks on the peripheral edge of the part. These defects can cause premature delamination or other failure.

In certain embodiments, the sacrificial portion of the fully-cured lay-up is removed by water-jet cutting. In water-jet cutting, the cutting force is applied in a direction perpendicular to the prepreg plies (in a direction normal to the front and rear surfaces of the lay-up), which minimizes the occurrence of cracking and fiber pull out. Consequently, water-jet cutting can be used to increase the overall durability of the part.

The potential mass "savings" obtained from fabricating at least a portion of the face plate of composite, as described above, is about 10-30 g, or more, relative to a 2.7-mm thick face plate formed from a titanium alloy such as Ti-6Al-4V, for example. In a specific example, a mass savings of about 15 g relative to a 2.7-mm thick face plate formed from a titanium alloy such as Ti-6Al-4V can be realized. As mentioned above, this mass can be allocated to other areas of the club, as desired.

Figure 12:
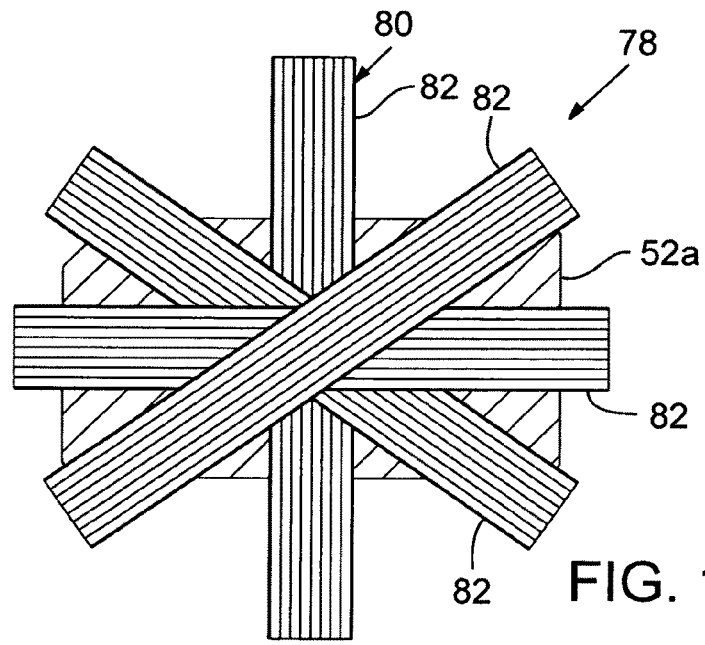
FIG. 12 is a plan view of a simplified lay-up of composite plies from which the component shown in FIG. 2 can be formed.

FIG. 12 shows a portion of a simplified lay-up 78 that can be used to form the composite part 40 (FIGS. 2-4). The lay-up 78 in this example can include multiple prepreg panels (e.g., panels 52a-52k) and one or more clusters 80 of prepreg strips 82. The illustrated cluster 80 comprises only four strips 82 of equal width arranged in a criss-cross pattern and which are equally angularly spaced or fanned with respect to each other about the center of the cluster. Although the figure shows only one cluster 80, the lay-up desirably includes multiple clusters 80 (e.g., 1 to 12 clusters, with 7 clusters in a specific embodiment). Each cluster is rotated or angularly offset with respect to an adjacent cluster to provide an angular offset between strips of one cluster with the strips of an adjacent cluster, such as described above, in order to form the reduced-thickness peripheral portion of the lay-up.

Figures 13, 15:
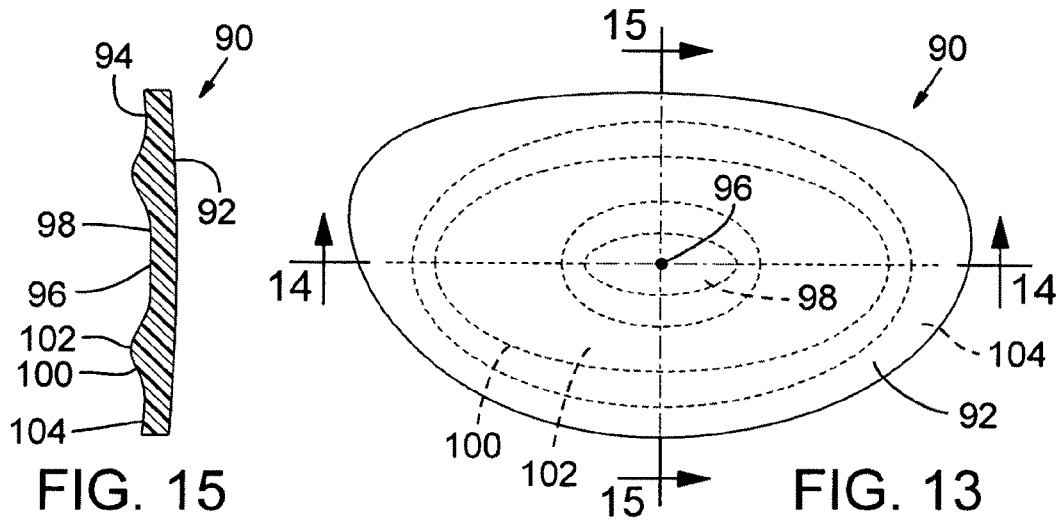
FIG. 13 is a front elevation view of another net-shape composite component that can be used to form the strike plate of a club-head.
FIG. 15 is a cross-sectional view taken along line 15-15 of FIG. 13.
Figure 14:
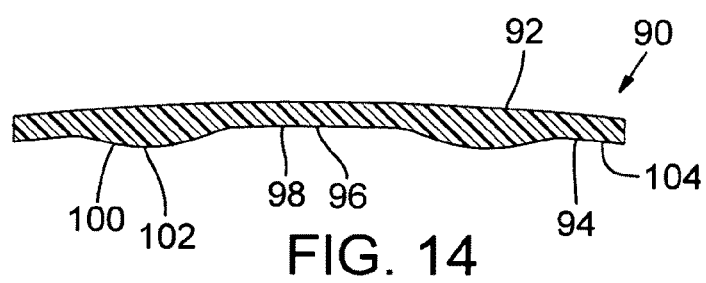
FIG. 14 is a cross-sectional view taken along line 14-14 of FIG. 13.

The embodiments described thus far provide a face plate having a projection or cone at the sweet spot. However, various other cross-sectional profiles can be achieved by selective placement of prepreg strips in the lay-up. FIGS. 13-15, for example, show a composite component 90 for use as a face plate for a club-head (either by itself or in combination with a polymeric or metal outer layer). The composite component 90 has a front surface 92, a rear surface 94, and an overall slightly convex shape. The reverse surface 94 defines a point 96 situated in a central recess 98. The point 96 represents the approximate center of the sweet spot of the face plate, not necessarily the center of the face plate, and is located in the approximate center of the recess 98. The central recess 98 is a "dimple" having a spherical or otherwise radiused sectional profile in this embodiment (see FIGS. 14 and 15), and is surrounded by an annular ridge 100. At the point 96 the thickness of the component 90 is less than at the "top" 102 of the annular ridge 100. The top 102 is normally the thickest portion of the component. Outward from the top 102, the thickness of the component gradually decreases to form a peripheral region 104 of substantially uniform thickness surrounding the ridge 100. Hence, the central recess 98 and surrounding ridge 100 have a cross-sectional profile that is reminiscent of a "volcano." Generally speaking, an advantage of this profile is that thinner central region is effective to provide a larger sweet spot, and therefore a more forgiving club-head.

Figure 16:
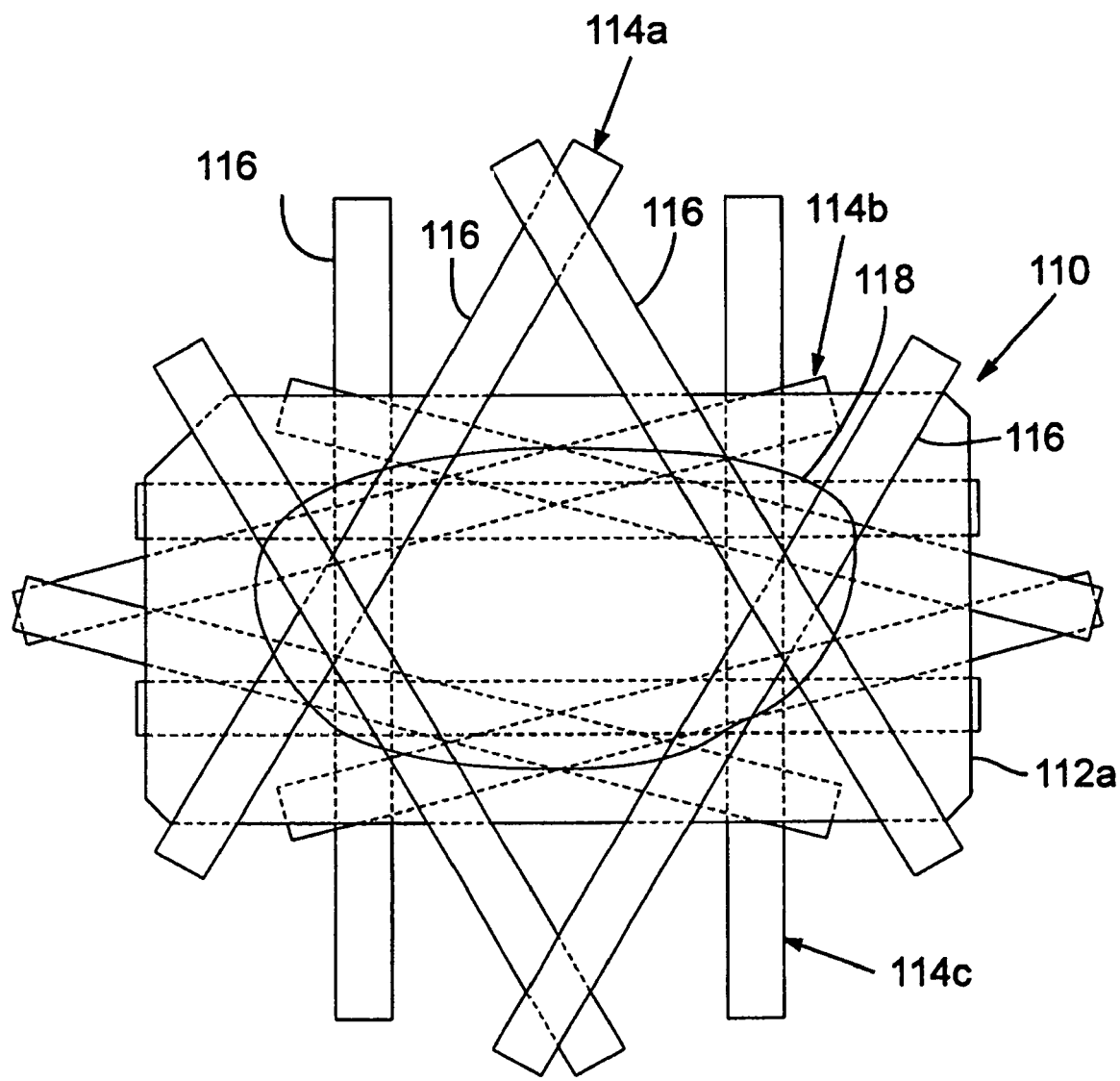
FIG. 16 is a top plan view of one embodiment of a lay-up of composite plies from which the component shown in FIG. 13 can be formed.
Figure 17:
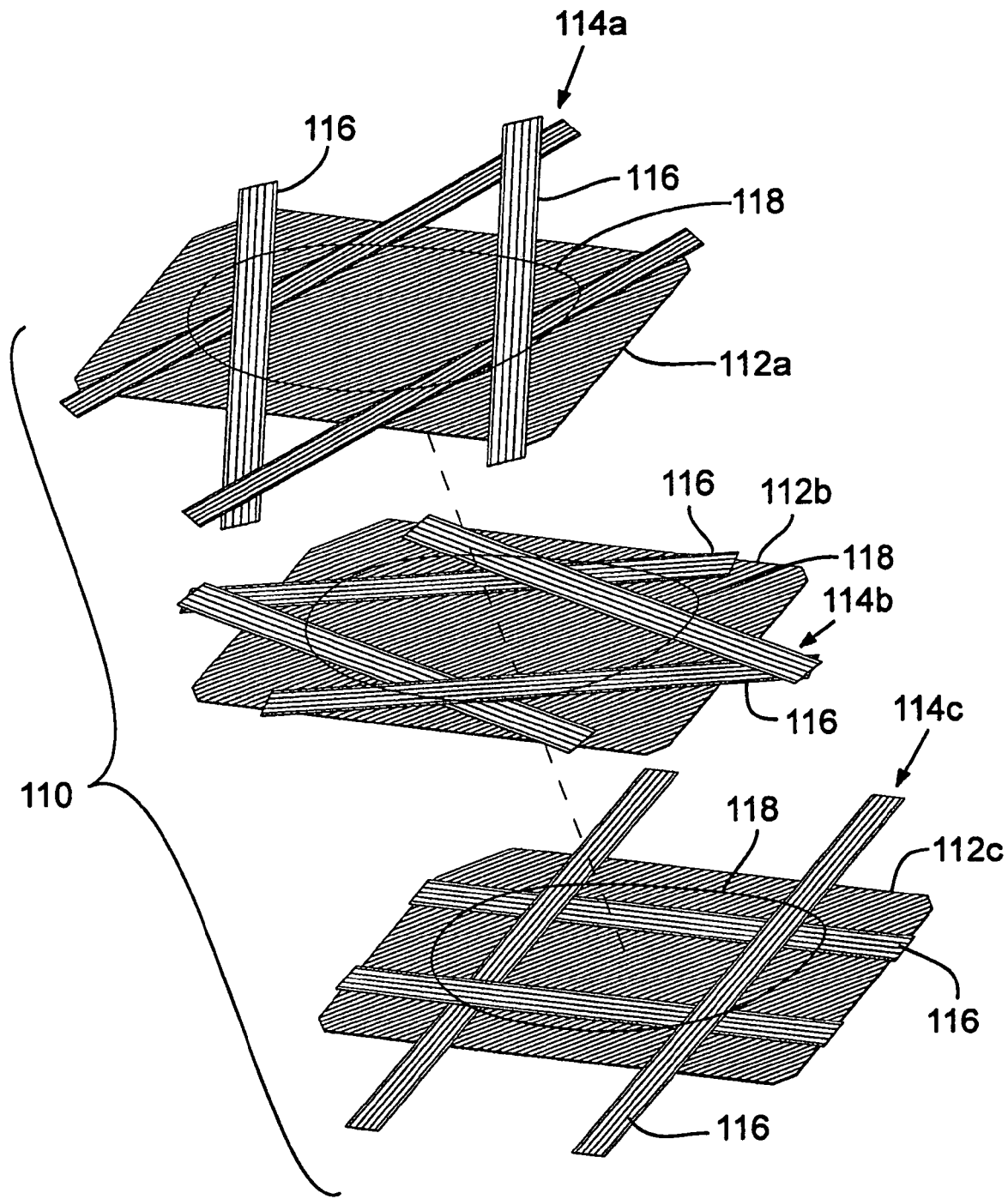
FIG. 17 is an exploded view of the first few groups of composite plies that are used to form the lay-up shown in FIG. 16.

FIG. 16 is a plan view of a lay-up 110 of multiple prepreg plies that can be used to fabricate the composite component 90. FIG. 17 shows an exploded view of a few of the prepreg layers that form the lay-up 110. As shown, the lay-up 110 includes multiple panels 112a, 112b, 112c of prepreg material and sets, or clusters, 114a, 114b, 114c of prepreg strips interspersed between the panels. The panels 112a-112c can be formed from one or more prepreg plies and desirably comprise four plies having respective fibers orientations of +45 degrees, 0 degrees, −45 degrees, and 90 degrees, in the manner described above. The line 118 in FIGS. 16 and 17 represent the outline of the composite component 90 and the portion surrounding the line 118 is a sacrificial portion. Once the lay-up 110 is cured, the sacrificial portion surrounding the line 118 can be removed to form the component 90.

Each cluster 114a-114c in this embodiment comprises four criss-cross strips 116 arranged in a specific shape. In the illustrated embodiment, the strips of the first cluster 114a are arranged to form a parallelogram centered on the center of the panel 112a. The strips of the second cluster 114b also are arranged to form a parallelogram centered on the center of the panel 112b and rotated 90 degrees with respect to the first cluster 114a. The strips of the third cluster 114c are arranged to form a rectangle centered on the center of panel 112c. When stacked in the lay-up, as best shown in FIG. 16, the strips 116 of clusters 114a-114c overlay one another so as to collectively form an oblong, annular area of increased thickness corresponding to the annular ridge 100 (FIG. 14). Hence, the fully-formed lay-up has a rear surface having a central recess and a surrounding annular ridge of increased thickness formed collectively by the build up of strip clusters 114a-114c. Additional panels 112a-112c and strip clusters 114a-114c may be added to lay-up to achieve a desired thickness profile.

It can be appreciated that the number of strips in each cluster can vary and still form the same profile. For example, in the another embodiment, clusters 114a-114c can be stacked immediately adjacent each other between adjacent panels 112 (i.e., effectively forming one cluster of twelve strips 116).

The lay-up 110 may be cured and shaped to remove the sacrificial portion of the lay-up (the portion surrounding the line 118 in FIG. 16 representing the finished part), as described above, to form a net shape part. As in the previous embodiments, each strip 116 is of sufficient length to extend continuously across the part 90 so that the free ends of the fibers are located on the peripheral edge of the part. In this manner, the net shape part can be formed free of any voids, or with an extremely low void content (e.g., about $1.7 \times 10^{-6}$ percent or less by volume) and can have straight fibers in each layer of prepreg material.

As mentioned above, any of various cross-sectional profiles can be achieved by arranging strips of prepreg material in a predetermined manner. Examples of other face plate profiles that can be formed by the techniques described herein are disclosed in U.S. Pat. Nos. 6,800,038, 6,824,475, 6,904,663, and 7,066,832, all of which are incorporated herein by reference.

As mentioned above, the face plate 12 (FIG. 1) can include a composite plate and a metal cap covering the front surface of the composite plate. One such embodiment is shown, for example, in the partial section depicted in FIG. 18, in which the face plate 12 comprises a metal "cap" 130 formed or placed over a composite plate 40 to form the strike surface 13. The cap 130 includes a peripheral rim 132 that covers the peripheral edge 134 of the composite plate 40. The rim 132 can be continuous or discontinuous, the latter comprising multiple segments (not shown).

The metal cap 130 desirably is bonded to the composite plate 40 using a suitable adhesive 136, such as an epoxy, polyurethane, or film adhesive. The adhesive 136 is applied so as to fill the gap completely between the cap 130 and the composite plate 40 (this gap usually in the range of about 0.05-0.2 mm, and desirably is approximately 0.1 mm). The face plate 12 desirably is bonded to the body 14 using a suitable adhesive 138, such as an epoxy adhesive, which completely fills the gap between the rim 132 and the adjacent peripheral surface 140 of the face support 18 and the gap between the rear surface of the composite plate 40 and the adjacent peripheral surface 142 of the face support 18.

A particularly desirable metal for the cap 130 is titanium alloy, such as the particular alloy used for fabricating the body (e.g., Ti-6Al-4V). For a cap 130 made of titanium alloy, the thickness of the titanium desirably is less than about 1 mm, and more desirably less than about 0.3 mm. The candidate titanium alloys are not limited to Ti-6Al-4V, and the base metal of the alloy is not limited to Ti. Other materials or Ti alloys can be employed as desired. Examples include commercially pure (CP) grade Ti, aluminum and aluminum alloys, magnesium and magnesium alloys, and steel alloys.

Surface roughness can be imparted to the composite plate 40 (notably to any surface thereof that will be adhesively bonded to the body of the club-head and/or to the metal cap 130). In a first approach, a layer of textured film is placed on the composite plate 40 before curing the film (e.g., "top" and/or "bottom" layers discussed above). An example of such a textured film is ordinary nylon fabric. Conditions under which the adhesives 136, 138 are cured normally do not degrade nylon fabric, so the nylon fabric is easily used for imprinting the surface topography of the nylon fabric to the surface of the composite plate. By imparting such surface roughness, adhesion of urethane or epoxy adhesive, such as 3M® DP 460, to the surface of the composite plate so treated is improved compared to adhesion to a metallic surface, such as cast titanium alloy.

In a second approach, texture can be incorporated into the surface of the tool used for forming the composite plate 40, thereby allowing the textured area to be controlled precisely and automatically. For example, in an embodiment having a composite plate joined to a cast body, texture can be located on surfaces where shear and peel are dominant modes of failure.

Figure 18:
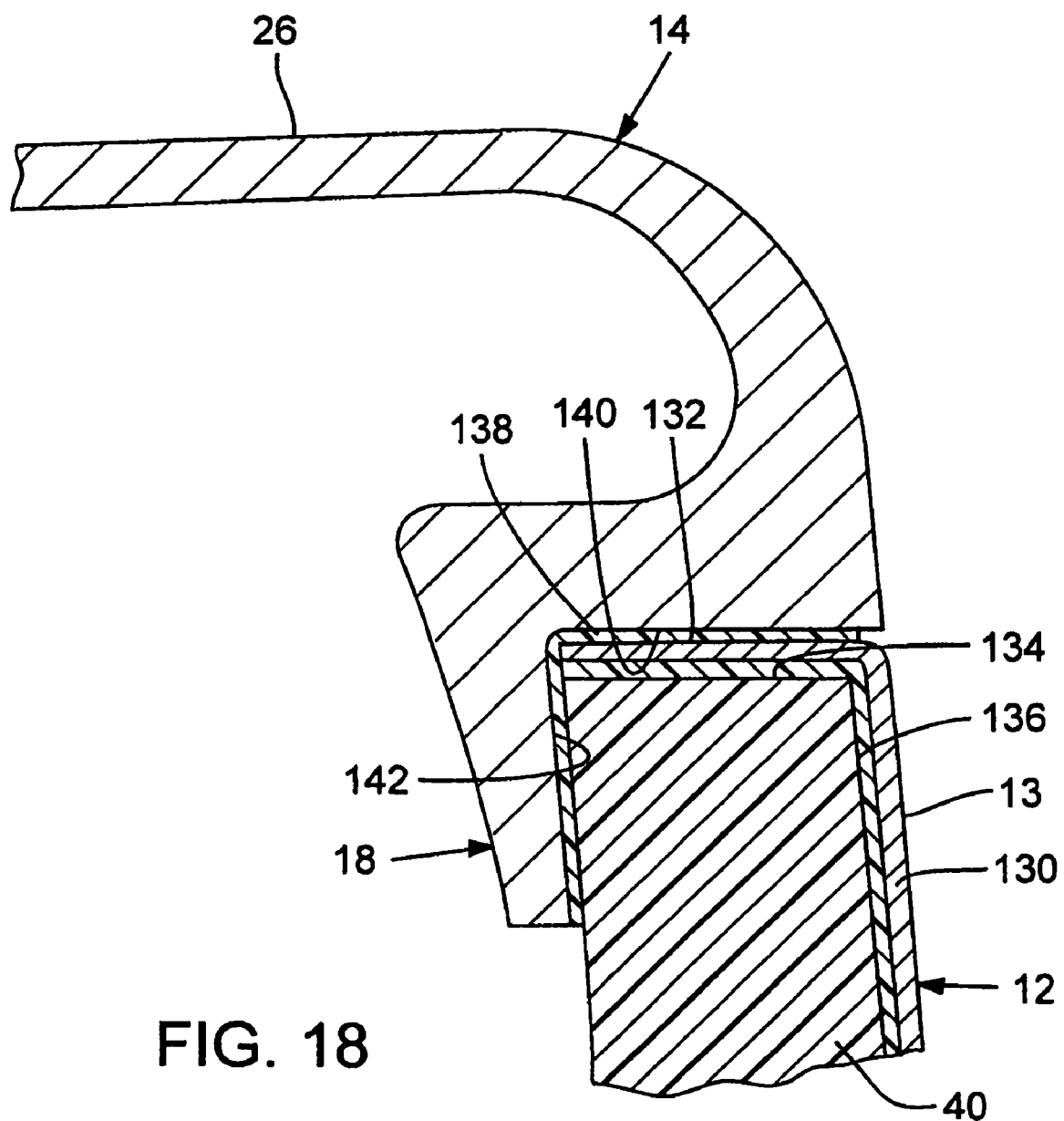
FIG. 18 is a partial sectional view of the upper lip region of an embodiment of a club-head of which the face plate comprises a composite plate and a metal cap.
Figure 19:
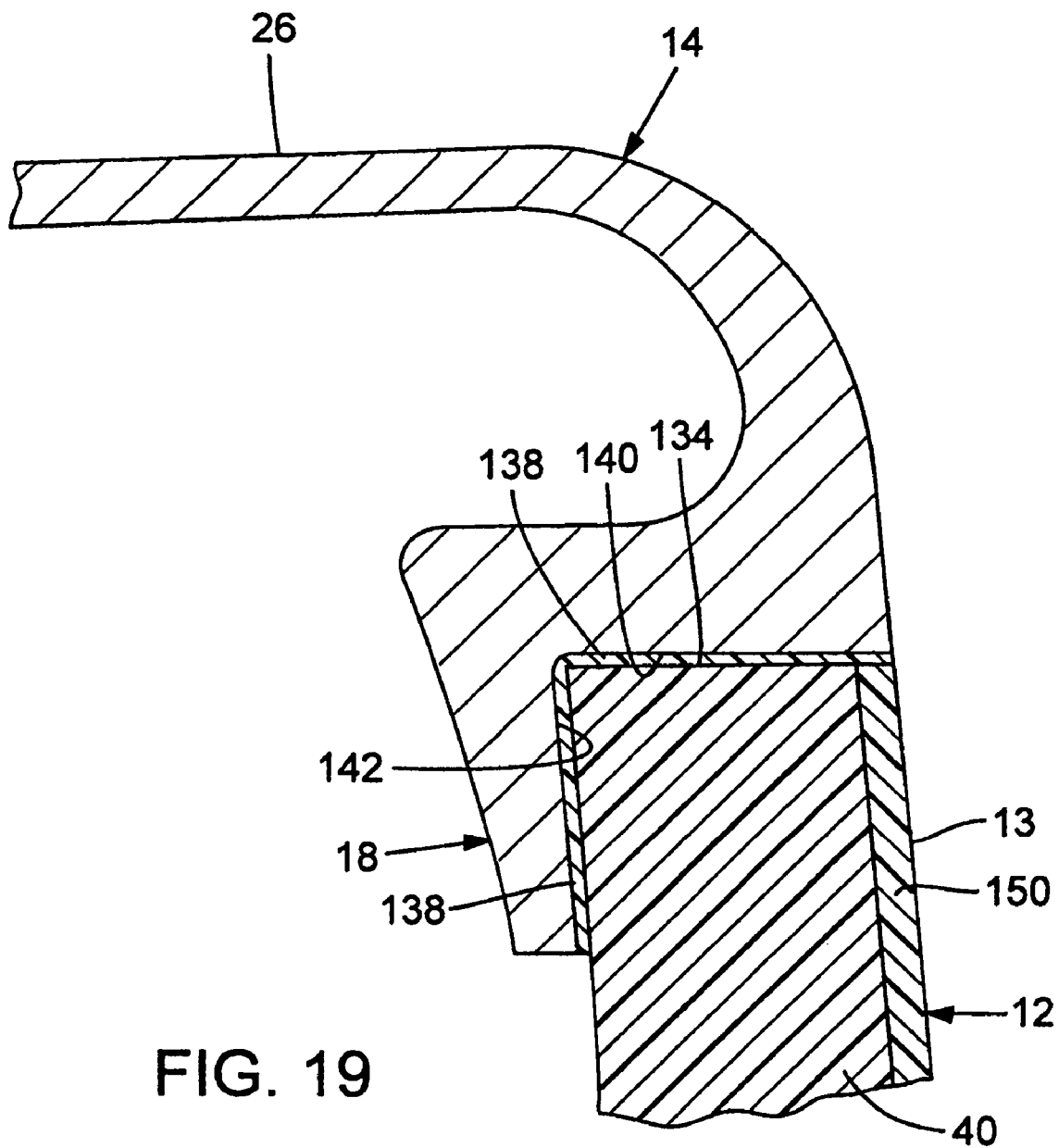
FIG. 19 is a partial sectional view of the upper lip region of an embodiment of a club-head of which the face plate comprises a composite plate and a polymeric outer layer.

FIG. 19 shows an embodiment similar to that shown in FIG. 18, with one difference being that in the embodiment of FIG. 19, the face plate 12 includes a polymeric outer layer, or cap, 150 on the front surface of the composite plate 40 forming the striking surface 13. The outer layer 150 desirably completely covers at least the entire front surface of the composite plate 40. A list of suitable polymers that can be used as an outer layer on a face plate is provide below. A particularly desirable polymer is urethane. For an outer layer 150 made of urethane, the thickness of the layer desirably is in the range of about 0.2 mm to about 1.2 mm, with about 0.4 mm being a specific example. As shown, the face plate 12 can be adhesively secured to the face support 18 by an adhesive 138 that completely fills the gap between the peripheral edge 134 and the adjacent peripheral surface 140 of the face support 18 and the gap between the rear surface of the composite plate 40 and the adjacent peripheral surface 142 of the face support 18.

The composite face plate as described above need not be coextensive (dimensions, area, and shape) with a typical face plate on a conventional club-head. Alternatively, a subject composite face plate can be a portion of a full-sized face plate, such as the area of the "sweet spot." Both such composite face plates are generally termed "face plates" herein. Further, the composite plate 40 itself (without additional layers of material bonded or formed on the composite plate) can be used as the face plate 12.

EXAMPLE 1

In this example, a number of composite strike plates were formed using the strip approach described above in connection with FIGS. 2-9. A number of strike plates having a similar profile were formed using the partial ply approach described above. Five plates of each batch were sectioned and optically examined for voids. Table 1 below reports the yield of the examined parts. The yield is the percentage of parts made that did not contain any voids. As can be seen, the strip approach provided a much greater yield of parts without voids than the partial ply approach. The remaining parts of each batch were then subjected to endurance testing during which the parts were subjected to 3600 impacts at a ball speed of 50 m/s. As shown in Table 1, the parts made by the strip approach yielded a much higher percentage of parts that survived 3600 impacts than the parts made by the partial ply approach (72.73% vs. 52%). Table 1 also shows the average characteristic time (CT) (ball contact time with the strike plate) measured during the endurance test.

TABLE 1

|  | Average weight (g) | Yield (%) | CT (μs) | Pieces tested | Number of passing parts | % of passing parts | Maximum shots |
| --- | --- | --- | --- | --- | --- | --- | --- |
| Strip | 21.9 | 81 | 255 | 11 | 8 | 72.73 | 3600 |
| Partial ply | 21.6 | 57.5 | 259 | 25 | 13 | 52 | 3600 |

EXAMPLE 2

In this example, a number of composite strike plates were formed using the strip approach described above in connection with FIGS. 2-9. A number of strike plates having a similar profile were formed using the partial ply approach above. Five plates of each batch were sectioned and optically examined for voids. Table 2 below reports the yield of the parts formed by both methods. As in Example 1, the strip approach provided a much greater yield of parts without voids than the partial ply approach (90% vs. 70%). The remaining parts of each batch were then subjected to endurance testing during which the parts were subjected to 3600 impacts at a ball speed of 42 m/s. At this lower speed, all of the tested parts survived 3600 impacts.

TABLE 2

|  | Average weight (g) | Yield (%) | CT (μs) | Pieces tested | Number of passing parts | % of passing parts | Maximum shots |
| --- | --- | --- | --- | --- | --- | --- | --- |
| Strip | 22 | 90 | 255 | 11 | 11 | 100 | 3600 |
| Partial ply | 21.5 | 70 | 258 | 16 | 16 | 100 | 3600 |

The methods described above provide improved structural integrity of the face plates and other club-head components manufactured according to the methods, compared to composite component manufactured by prior-art methods. These methods can be used to fabricate face plates for any of various types of clubs, such as (but not limited to) irons, wedges, putter, fairway woods, etc., with little to no process-parameter changes.

The subject methods are especially advantageous for manufacturing face plates because face plates are the most severely loaded components in golf club-heads. If desired, conventional (and generally less expensive) composite-processing techniques (e.g., bladder-molding, etc.) can be used to make other parts of a club-head not subject to such severe loads.

Moreover, the methods for fabricating composite parts described herein can be used to make various other types of composite parts, and in particular, parts that are subject to high impact loads and/or repetitive loads. Some examples of such parts include, without limitation, a hockey stick (e.g., the blade of a stick), a bicycle frame, a baseball bat, and a tennis racket, to name a few.

EXAMPLE 3

Figures 20, 21:
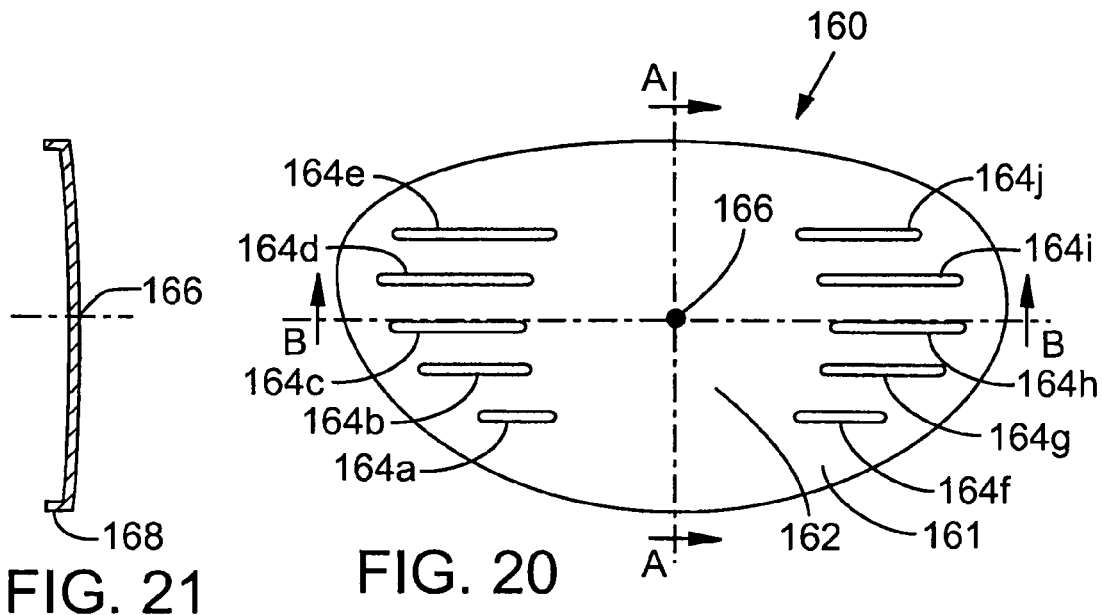
FIGS. 20-23 illustrate a metallic cover for a composite face plate.
Figure 22:
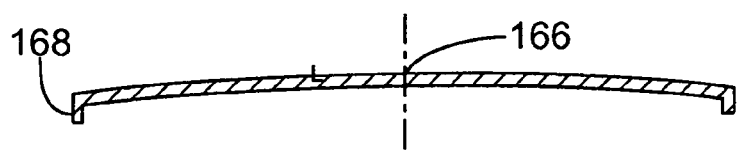

As shown in FIGS. 18-19, a metallic cover can be provided so that a golf club striking plate includes a composite face plate and a metallic striking surface that tends to be wear resistant. A representative metallic cover 160 is illustrated in detail in FIGS. 20-23. Referring to FIG. 20, the metallic cover 160 provides a striking surface 161 that includes a central striking region 162 and a plurality of contrasting scorelines 164a-164j that are associated with respective dents, depressions, or indentations in the metallic cover that are generally filled with a contrasting pigment or paint such as white paint. Scorelines generally extend along an axis parallel to a toe-to-heel direction. In a representative example, scorelines have lengths of between about 6 mm and 14 mm, with scoreline lengths larger toward a golf club crown. The scorelines are spaced about 6-7 mm apart in a top-to-bottom direction. The arrangement of FIG. 20 is one example, and other arrangements can be used.

The metallic cover 160 is generally made of a titanium alloy or other metal such as those mentioned above, and has a bulge/roll center 166 for bulge and roll curvatures that are provided to control club performance. Centers of curvature for bulge/roll curvatures are typically situated on an axis that is perpendicular to the striking surface 161 at the bulge/roll center 166. In this example, innermost edges of the scorelines 164a-164j are situated along a circumference of a circle having a diameter of about 40-50 mm that is centered at the bulge/roll center 166. As shown in the sectional view of FIG. 21, a "roll" radius of curvature (a top-to-bottom radius of curvature) is about 300 mm and is symmetric about the bulge/roll center. As shown in the sectional view of FIG. 22, a "bulge" radius of curvature (a toe-to-heel radius of curvature) is about 410 mm and is symmetric about the bulge/roll center 166. Bulge and roll curvatures can be spherical or circular curvatures, but other curvatures such as elliptical, oval, or other curvatures can be provided. In this example, a rim 168 is provided and is intended to at least partially cover an edge of a composite faceplate to which the metallic cover 160 is attached.

Figure 23:
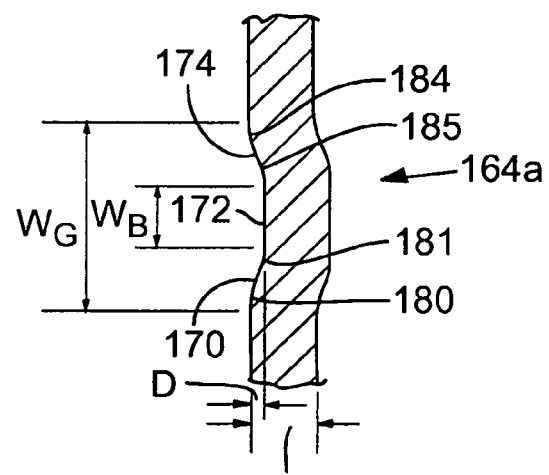
Figure 24:
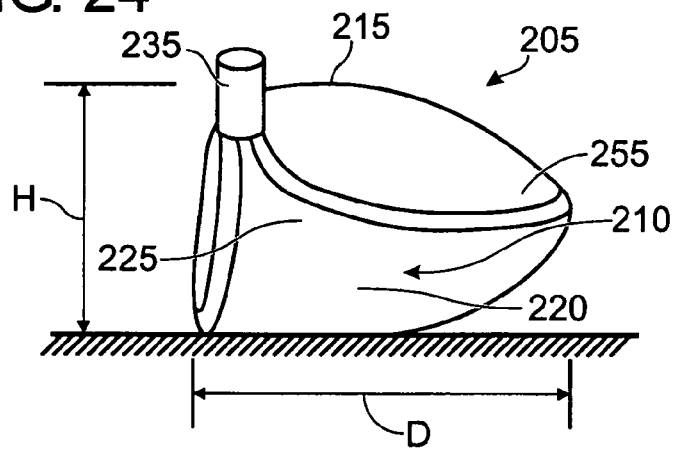
FIG. 24 is a side perspective view of a wood-type golf club head.
Figure 25:
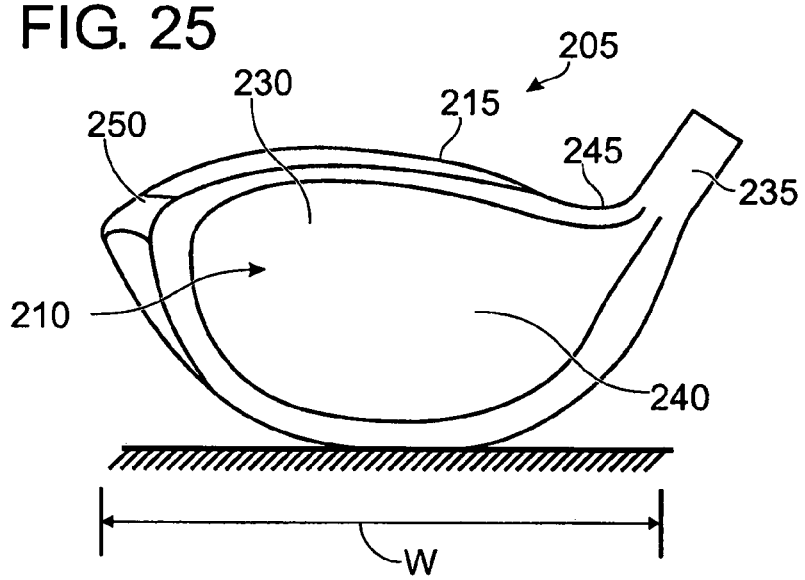
FIG. 25 is a front perspective view of a wood-type golf club head.
Figure 26:
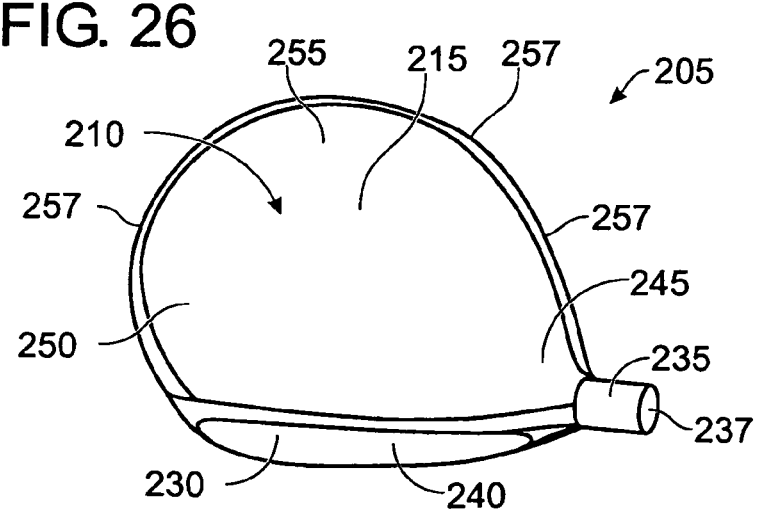
FIG. 26 is a top perspective view of a wood-type golf club head.
Figure 27:
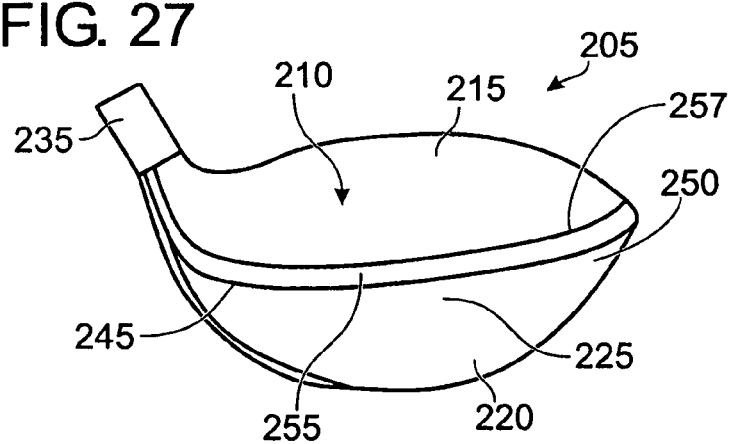
FIG. 27 is a back perspective view of a wood-type golf club head.

The striking region 162 can be roughened by sandblasting, bead blasting, sanding, or other abrasive process or by a machining or other process. The scorelines 164a-164j are situated outside of the intended striking region 162 and are generally provided for visual alignment and do not typically contribute to ball trajectory. A cross-section of a representative scoreline 164a is shown in FIG. 23 (paint or other pigment is not shown). The scoreline 164a is provided as an indentation in the cover 160 and includes transition portions 170, 174 and a bottom portion 172. For a thin cover plate (thickness less than about 1.0 mm, 0.5 mm, 0.3 mm, or 0.2 mm), the scoreline 164a can be formed by pressing a correspondingly shaped tool against a sheet of a selected cover plate material. An overall curvature for the cover 160 can also be provided in the same manner based on a bulge and roll of a face plate such as a composite face plate to which the cover 160 is to be applied. For a typical cover thickness, indented scorelines are associated with corresponding protruding features on a rear surface 176 of the cover 160. In this example, the scoreline 164a has a depth D of about 0.07 mm in a cover having a thickness T of about 0.30 mm. A width $W_B$ of the bottom portion 172 is about 0.29 mm, and a width $W_G$ of the entire indent is about 0.90 mm. The transition portions 170, 174 have inner and outer radiused regions 181, 185 and 180, 184, respectively, having respective radii of curvature of about 0.40 mm and 0.30 mm.

In other examples, a cover can be between about 0.10 mm and 1.0 mm thick, between about 0.2 mm and 0.8 mm thick, or between about 0.3 mm and 0.5 mm thick. Indentation depths between about 0.02 mm and 0.12 mm or about 0.06 mm and 0.10 mm are generally preferred for scoreline definition. Impact resistant cover plates with scorelines generally have scoreline depths D and cover plate thicknesses T such that a ratio D/T is less than about 0.4, 0.3, 0.25, or 0.20. A ratio $W_B/T$ is typically between about 0.5 and 1.5, 0.75 and 1.25, or 0.9 and 1.1. A ratio $W_G/T$ is typically between about 1 and 5, 2 and 4, or 2.5 and 3.5. A ratio of transition region radii of curvature R to cover thickness T is typically between about 0.5 and 1.5, 0.67 and 1.33, or 0.75 and 1.33. While it is convenient to provide scorelines based on common indentation depths, scorelines on a single cover can be based on indentations of one or more depths.

For wood-type golf clubs, an impact area is based on areas associated with inserts used in traditional wood golf clubs. For irons, an impact area is a portion of the striking surface within 20 mm on either side of a vertical centerline, but does not include 6.35 mm wide strips at the top and bottom of the striking surface. For wood-type golf clubs, scorelines are generally provided in a cover so as to be situated exterior to an impact region. The disclosed covers with scorelines are sufficiently robust for placement within or without an impact region for either wood or iron type golf clubs.

A cover is generally formed from a sheet of cover stock that is processed so as to have a bulge/roll region that includes the necessary arrangement of scoreline dents. The formed cover stock is then trimmed to fit an intended face plate, and attached to the face plate with an adhesive. Typically a glue layer is situated between the cover and the face plate, and the cover and face plate are urged together so as to form an adhesive layer of a suitable thickness. For typical adhesives, layer thicknesses between about 0.05 mm and 0.10 mm are preferred. Once a suitable layer thickness is achieved, the adhesive can be cured or allowed to set. In some cases, the cover includes a cover lip or rim as well so as to cover a face plate perimeter. The scoreline indentations are generally filled with paint of a color that contrasts with the remainder of the striking surface.

Although the scorelines are provided to realize a particular appearance in a finished product, the indentations used to define the scorelines also serve to control adhesive thickness. As a cover plate and a face plate are urged together in a gluing operation, the rear surface protrusions associated with the indentations tend to approach the face plate and thus regulate an adhesive layer thickness. Accordingly, indentation depth can be selected not only to retain paint or other pigment on a striking face, but can also based on a preferred adhesive layer thickness. In some examples, protruding features of indentations in a cover plate are situated at distances of less than about 0.10 mm, 0.05 mm, 0.03 mm, and 0.01 mm from a face plate surface as an adhesive layer thickness is established.

In other examples, the indent-based scorelines shown in FIGS. 20-23 can be replaced with grooves that are punched, machined, etched or otherwise formed in a cover plate sheet. Indentations are generally preferable as gluing operations based on indented plates are not generally associated with adhesive transfer to the striking surface. In addition, striking plates made with dented metallic covers tend to be more stable in long term use than cover plates that have been machined or punched. Scoreline or indent dimensions (length, depth, and transition region dimensions and curvatures) as well as scoreline or indentation location on a striking surface are preferably selected based on a selected cover material or cover material thickness. Fabrication methods (such as punching, machining) tend to produce cover plates that are more likely to show wear under impact endurance testing in which a finished striking plate is subject to the forces associated with 3000 shots by, for example, forming a club head with a striking plate under test, and making 3000 shots with the club head. A cover that performs successfully under such testing without degradation is referred as an impact-resistant cover plate.

In alternative embodiments, a cover includes a plurality of slots situated around a striking region. A suitably colored adhesive can be used to secure the cover layer to a face plate so that the adhesive fills the slots or is visible through the slots so to provide visible orientation guides on the striking plate surface.

EXAMPLE 4

Polymer or other surface coatings or surface layers can be provided to composite or other face plates to provide performance similar to that of conventional irons and metal type woods. Such surface layers, methods of forming such layers, and characterization parameters for such layers are described below.

Surface Texture and Roughness

Surface textures or roughness can be conveniently characterized based a surface profile, i.e., a surface height as a function of position on the surface. A surface profile is typically obtained by interrogating a sample surface with a stylus that is translated across the surface. Deviations of the stylus as a function of position are recorded to produce the surface profile. In other examples, a surface profile can be obtained based on other contact or non-contact measurements such as with optical measurements. Surface profiles obtained in this way are often referred to as "raw" profiles. Alternatively, surface profiles for a golf club striking surface can be functionally assessed based on shot characteristics produced when struck with surfaces under wet conditions.

For convenience, a control layer is defined as a striking face cover layer configured so that shots are consistent under wet and dry playing conditions. Generally, satisfactory roughened or textured striking surfaces (or other control surfaces) provide ball spins of at least about 2000 rpm, 2500 rpm, 3000 rpm, or 3500 rpm under wet conditions when struck with club head speeds of between about 75 mph and 120 mph. Such control surfaces thus provide shot characteristics that are substantially the same as those obtained with conventional metal woods. Stylus or other measurement based surface roughness characterizations for such control surfaces are described in detail below.

A surface profile is generally processed to remove gradual deviations of the surface from flatness. For example, a wood-type golf club striking face generally has slight curvatures from toe-to-heel and crown-to-sole to improve ball trajectory, and a "raw" surface profile of a striking surface or a cover layer on the striking surface can be processed to remove contributions associated with these curvatures. Other slow (i.e., low spatial frequency) contributions can also be removed by such processing. Typically features of size of about 1 mm or greater (or spatial frequencies less than about 1/mm) can be removed by processing as the contributions of these features to ball spin about a horizontal or other axis tend to be relatively small. A raw (unprocessed) profile can be spatially filtered to enhance or suppress high or low spatial frequencies. Such filtering can be required in some measurements to conform to various standards such as DIN or other standards. This filtering can be performed using processors configured to execute a Fast Fourier Transform (FFT).

Generally, a patterned roughness or texture is applied to a substantial portion of a striking surface or at least to an impact area. For wood-type golf clubs, an impact area is based on areas associated with inserts used in traditional wood golf clubs. For irons, an impact area is a portion of the striking surface within 20 mm on either side of a vertical centerline, but does not include 6.35 mm wide strips at the top and bottom of the striking surface. Generally, such patterned roughness need not extend across the entire striking surface and can be provided only in a central region that does not extend to a striking surface perimeter. Typically for hollow metal woods, at least some portions of the striking surface at the striking surface perimeter lack pattern roughness in order to provide an area suitable for attachment of the striking plate to the head body.

Striking surface roughness can be characterized based on a variety of parameters. A surface profile is obtained over a sampling length of the striking surface and surface curvatures removed as noted above. An arithmetic mean $R_a$ is defined a mean value of absolute values of profile deviations from a mean line over a sampling length of the surface. For a surface profile over the sampling length that includes N surface samples each of which is associated with a mean value of deviations $Y_i$, from the mean line, the arithmetic mean $R_a$ is:

$$R_a = \frac{1}{N}\sum_{i=1}^{N}|Y_i|,$$

wherein i is an integer i=1, ..., N. The sampling length generally extends along a line on the striking surface over a substantial portion or all of the striking area, but smaller samples can be used, especially for a patterned roughness that has substantially constant properties over various sample lengths. Two-dimensional surface profiles can be similarly used, but one dimensional profiles are generally satisfactory and convenient. For convenience, this arithmetic mean is referred to herein as a mean surface roughness.

A surface profile can also be further characterized based on a reciprocal of a mean width $S_m$ of the profile elements. This parameter is used and described in one or more standards set forth by, for example, the German Institute for Standardization (DIN) or the International Standards Organization (ISO). In order to establish a value for $S_m$, an upper count level (an upward surface deviation associated with a peak) and a lower count level (a downward surface deviation associated with a valley) are defined. Typically, the upper count level and the lower count level are defined as values that are 5% greater than the mean line and 5% less than the mean line, but other count levels can be used. A portion of a surface profile projecting upward over the upper count level is called a profile peak, and a portion projecting downward below the given lower count level is called a profile valley. A width of a profile element is a length of the segment intersecting with a profile peak and the adjacent profile valley. $S_m$ is a mean of profile element widths $S_{mi}$ within a sampling length:

$$S_m = \frac{1}{K}\sum_{i=1}^{K} S_{mi}$$

For convenience, this mean is referred to herein as a mean surface feature width.

In determining $S_m$, the following conditions are generally satisfied: 1) Peaks and valleys appear alternately; 2) An intersection of the profile with the mean line immediately before a profile element is the start point of a current profile element and is the end point of a previous profile element; and 3) At the start point of the sampling length, if either of the profile peak or profile valley is missing, the profile element width is not taken into account. Rpc is defined as a reciprocal of the mean width $S_m$ and is referred to herein as mean surface feature frequency.

Another surface profile characteristic is a surface profile kurtosis Ku that is associated with an extent to which profile samples are concentrated near the mean line. As used herein, a the profile kurtosis Ku is defined as:

$$Ku = \frac{1}{R_q^4} \square \frac{1}{N}\sum_{i=1}^{N}(Y_i)^4,$$

wherein $R_q$ a square root of the arithmetic mean of the squares of the profile deviations from the mean line, i.e., $$R_q = \left(\frac{1}{N}\sum_{i=1}^{N} Y_i^2\right)^{1/2}.$$

Profile kurtosis is associated with an extent to which surface features are pointed or sharp. For example, a triangular wave shaped surface profile has a kurtosis of about 0.79, a sinusoidal surface profile has a kurtosis of about 1.5, and a square wave surface profile has a kurtosis of about 1.

Other parameters that can be used to characterize surface roughness include $R_z$ which is based on a sum of a mean of a selected number of heights of the highest peaks and a mean of a corresponding number of depths of the lowest valleys.

One or more values or ranges of values can be specified for surface kurtosis Ku, mean surface feature width $S_m$, and arithmetic mean deviation $R_a$ (mean surface roughness) for a particular golf club striking surface. Superior results are generally obtained with $R_a \leq 5$ μm, $R_{pc} \geq 30$/cm, and $K_u \geq 2.0$.

Wood-Type Club Heads

For convenient illustration, representative examples of striking plates and cover layers for such striking plates are set forth below with reference to wood-type golf clubs. In other examples, such striking plates can be used in iron-type golf clubs. In some examples, face plate cover layers are formed on a surface of a face plate in a molding process, but in other examples surface layers are provided as caps that are formed and then secured to a face plate.

As illustrated in FIGS. 24-27, a typical wood type (i.e., driver or fairway wood) golf club head 205 includes a hollow body 210 delineated by a crown 215, a sole 220, a skirt 225, a striking plate 230, and a hosel 235. The striking plate 230 defines a front surface, or striking face 240 adapted for impacting a golf ball (not shown). The hosel 235 defines a hosel bore 237 adapted to receive a golf club shaft (not shown). The body 210 further includes a heel portion 245, a toe portion 250 and a rear portion 255. The crown 215 is defined as an upper portion of the club head 5 extending above a peripheral outline 257 of the club head as viewed from a top-down direction and rearwards of the topmost portion of the striking face 240. The sole 220 is defined as a lower portion of the club head 205 extending in an upwardly direction from a lowest point of the club head approximately 50% to 60% of the distance from the lowest point of the club head to the crown 215. The skirt 225 is defined as a side portion of the club head 205 between the crown 215 and the sole 220 extending immediately below the peripheral outline 257 of the club head, excluding the striking face 240, from the toe portion 250, around the rear portion 255, to the heel portion 245. The club head 205 has a volume, typically measured in cubic-centimeters ($cm^3$), equal to the volumetric displacement of the club head 205.

Figure 28:
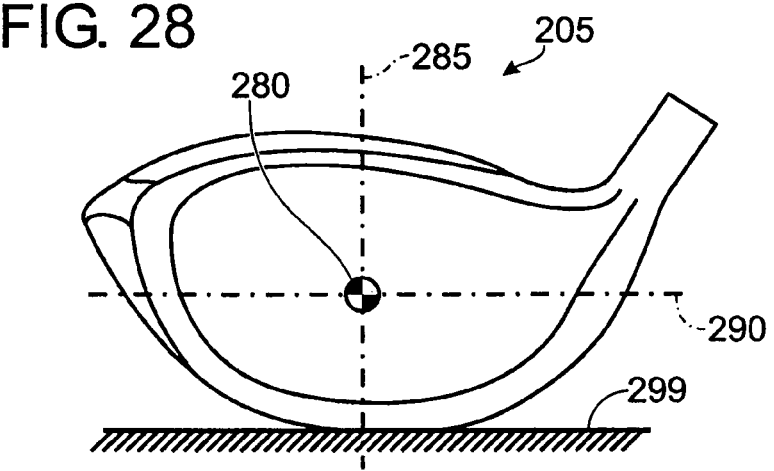
FIG. 28 is a front perspective view of a wood-type golf club head showing a golf club head center of gravity coordinate system.
Figure 29:
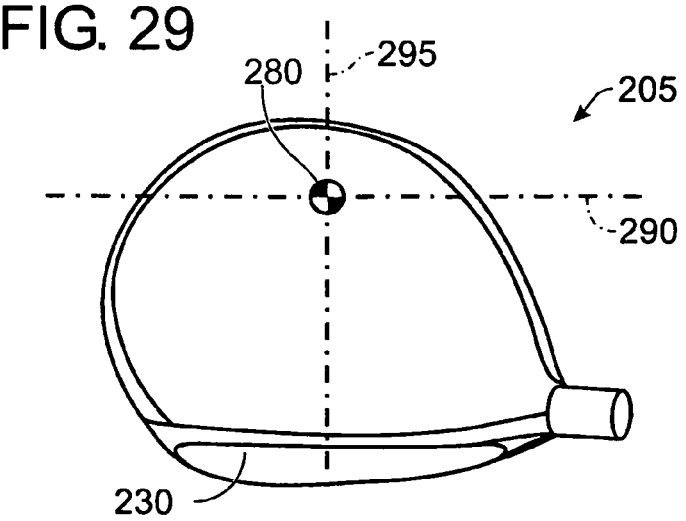
FIG. 29 is a top perspective view of a wood-type golf club head showing a golf club head center of gravity coordinate system.

Referencing FIGS. 28-29, club head coordinate axes can be defined with respect to a club head center-of-gravity (CG) 280. A $CG_z$-axis 285 extends through the CG 280 in a generally vertical direction relative to the ground 299 when the club head 205 is at address position. A $CG_x$-axis 290 extends through the CG 280 in a heel-to-toe direction generally parallel to the striking face 240 and generally perpendicular to the $CG_z$-axis 285. A $CG_y$-axis 95 extends through the CG 280 in a front-to-back direction and generally perpendicular to the $CG_x$-axis 290 and the $CG_z$-axis 285. The $CG_x$-axis 290 and the $CG_y$-axis 295 both extend in a generally horizontal direction relative to the ground when the club head 5 is at address position. The polymer coated or capped striking plates described herein generally provide 2-15 g of additional distributable mass so that placement of the CG 280 can be selected using this mass.

Figure 30:
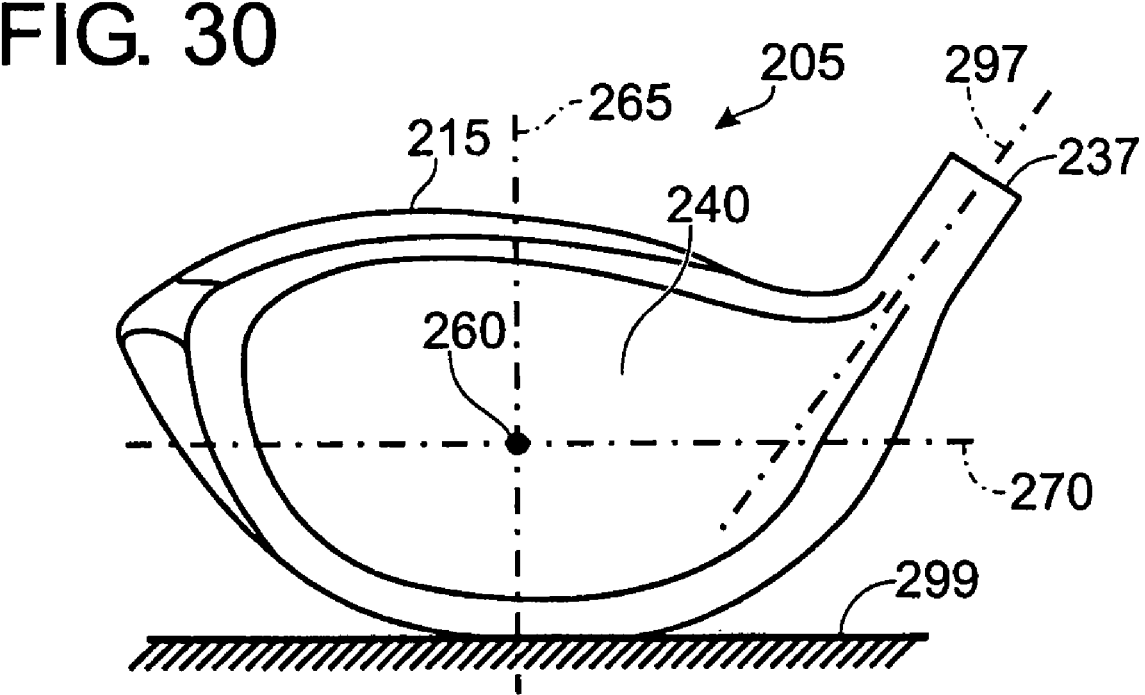
FIG. 30 is a front perspective view of a wood-type golf club head showing a golf club head origin coordinate system.
Figure 31:
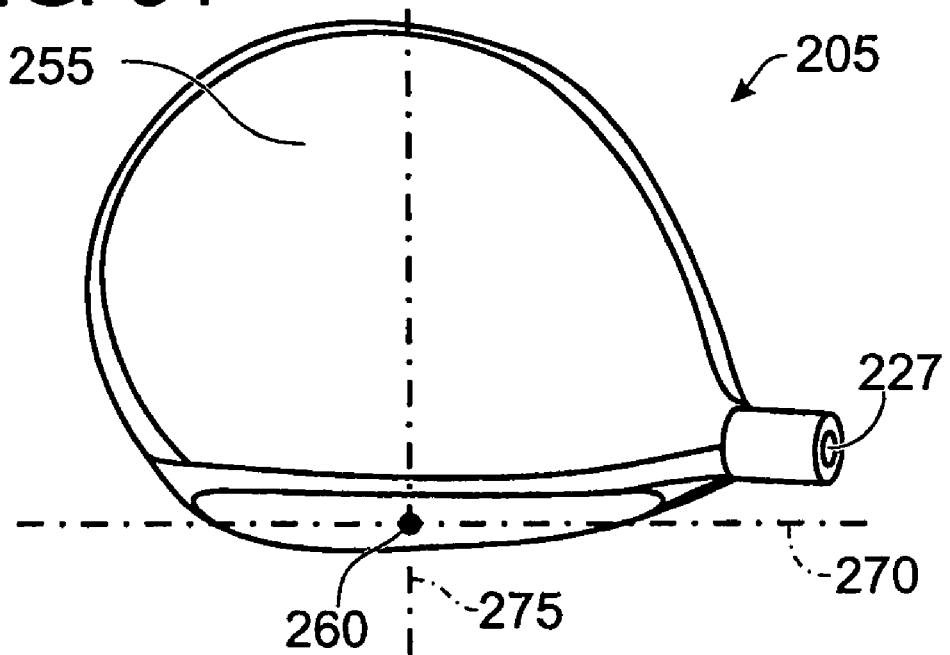
FIG. 31 is a top perspective view of a wood-type golf club head showing a golf club head origin coordinate system.

A club head origin coordinate system can also be used. Referencing FIGS. 30-31, a club head origin 260 is represented on club head 205. The club head origin 260 is positioned at an approximate geometric center of the striking face 240 (i.e., the intersection of the midpoints of the striking face's height and width, as defined by the USGA "Procedure for Measuring the Flexibility of a Golf Clubhead," Revision 2.0).

The head origin coordinate system, with head origin 260, includes three axes: a z-axis 265 extending through the head origin 260 in a generally vertical direction relative to the ground 100 when the club head 205 is at address position; an x-axis 270 extending through the head origin 60 in a heel-to-toe direction generally parallel to the striking face 240 and generally perpendicular to the z-axis 265; and a y-axis 275 extending through the head origin 260 in a front-to-back direction and generally perpendicular to the x-axis 270 and the z-axis 265. The x-axis 270 and the y-axis 275 both extend in a generally horizontal direction relative to the ground 299 when the club head 205 is at address position. The x-axis 270 extends in a positive direction from the origin 260 to the toe 250 of the club head 205; the y-axis 275 extends in a positive direction from the origin 260 towards the rear portion 255 of the club head 205; and the z-axis 265 extends in a positive direction from the origin 260 towards the crown 215.

In a club-head according to one embodiment, a striking plate includes a face plate and a cover layer. In addition, in some examples, at least a portion of the face plate is made of a composite including multiple plies or layers of a fibrous material (e.g., graphite, or carbon, fiber) embedded in a cured resin (e.g., epoxy). Examples of suitable polymers that can be used to form the cover layer include, without limitation, urethane, nylon, SURLYN ionomers, or other thermoset, thermoplastic, or other materials. The cover layer defines a striking surface that is generally a patterned, roughened, and/or textured surface as described in detail below. Striking plates based on composites typically permit a mass reduction of between about 5 g and 20 g in comparison with metal striking plates so that this mass can be redistributed.

In the example shown in FIGS. 32-34, a striking plate 380 includes a face plate 381 fabricated from a plurality of prepreg plies or layers and has a desired shape and size for use in a club-head. The face plate 381 has a front surface 382 and a rear surface 344. In this example, the face plate 381 has a slightly convex shape, a central region 346 of increased thickness, and a peripheral region 348 having a relatively reduced thickness extending around the central region 346. The central region 346 in the illustrated example is in the form of a projection or cone on the rear surface having its thickest portion at a central point 350 and gradually tapering away from the point in all directions toward the peripheral region 348. The central point 350 represents the approximate center of the "sweet spot" (optimal strike zone) of the striking plate 380, but not necessarily the geometric center of the face plate 381. The thicker central region 348 adds rigidity to the central area of the face plate 381, which effectively provides a more consistent deflection across the face plate. In certain embodiments, the face plate 381 is fabricated by first forming an oversized a lay-up of multiple prepreg plies that are subsequently trimmed or otherwise machined.

As shown in FIGS. 33-34, a cover layer 360 is situated on the front surface 382 of the face plate 381. The cover layer 360 includes a rear surface 362 that is typically conformal with and bonded to the front surface 382 of the face plate 381, and a striking surface 364 that is typically provided with patterned roughness so as to control or select a shot characteristic so as to provide performance similar to that obtained with conventional club construction. The cover layer 360 can be formed of a variety of polymers such as, for example, SURLYN ionomers, urethanes, or others. Representative polymers are disclosed in U.S. patent application Ser. Nos. 11/685,335, filed Mar. 13, 2007 and 11/809,432, filed May 31, 2007 that are incorporated herein by reference. These polymers are discussed with reference to golf balls, but are also suitable for use in striking plates as described herein. In some examples, the cover layer 360 can be co-cured with the prepreg layers that form the face plate 381. In other examples, the cover layer 360 is formed separately and then bonded or glued to the face plate 381. The cover layer 362 can be selected to provide wear resistance or ultraviolet protection for the face plate 381, or to include a patterned striking surface that provides consistent shot characteristics during play in both wet and dry conditions. Typically, surface textures and/or patterning are configured so as to substantially duplicate the shot characteristics achieved with conventional wood clubs or metal wood type clubs with metallic striking plates. To enhance wear resistance, a Shore D hardness of the cover layer 360 is preferably sufficient to provide a striking face effective hardness with the polymer layer applied of at least about 75, 80, or 85. In typical examples, a thickness of the cover layer 360 is between about 0.1 mm and 3.0 mm, 0.15 mm and 2.0 mm, or 0.2 mm and 1.2 mm. In some examples, the cover layer 360 is about 0.4 mm thick.

Club face hardness or striking face hardness is generally measured based on a force required to produce a predetermined penetration of a probe of a standard size and/or shape in a selected time into a striking face of the club, or a penetration depth associated with a predetermined force applied to the probe. Based on such measurements, an effective Shore D hardness can be estimated. For the club faces described herein, the Shore D hardness scale is convenient, and effective Shore D hardnesses of between about 75 and 90 are generally obtained. In general, measured Shore D values decrease for longer probe exposures. Club face hardnesses as described herein are generally based on probe penetrations sufficient to produce an effective hardness estimate (an effective Shore D value) that can be associated with shot characteristics substantially similar to conventional wood or metal wood type golf clubs. The effective hardness generally depends on faceplate and polymer layer thicknesses and hardnesses.

Figure 35:
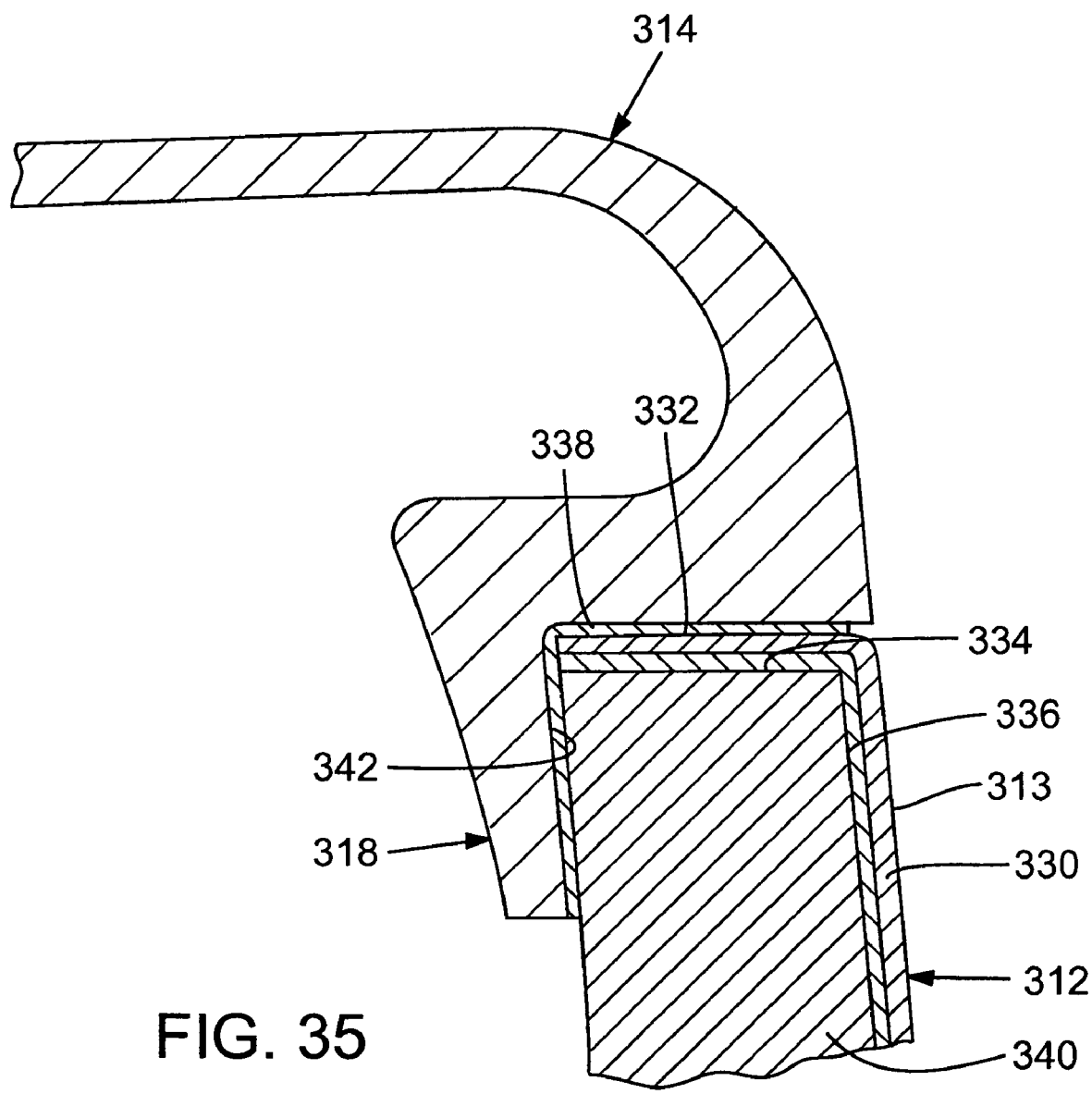
FIG. 35 illustrates attachment of a striking plate comprising a face plate and a cover layer to a club body.

As shown in FIG. 35, a striking plate 312 comprises a cover layer 330 formed or placed over a composite face plate 340 to form a striking surface 313. In other examples, the cover layer 330 can include a peripheral rim that covers a peripheral edge 334 of the composite face plate 340. The rim 332 can be continuous or discontinuous, the latter comprising multiple segments (not shown). The cover layer 330 can be bonded to the composite plate 340 using a suitable adhesive 336, such as an epoxy, polyurethane, or film adhesive, or otherwise secured. The adhesive 336 is applied so as to fill the gap completely between the cover layer 330 and the composite plate 340 (this gap is usually in the range of about 0.05-0.2 mm, and desirably is less than approximately 0.05 mm). Typically the cover layer 330 is formed directly on the face plate, and the adhesive 336 is omitted. The striking plate 312 desirably is bonded to a club body 314 using a suitable adhesive 338, such as an epoxy adhesive, which completely fills the gap between the rim 332 and the adjacent peripheral surface 338 of the face support 318 and the gap between the rear surface of the composite plate 340 and the adjacent peripheral surface 342 of the face support 318. In the example of FIG. 35, the cover layer 330 extends at least partially around a faceplate edge, but in other examples, a cover layer is situated only on an external surface of the face plate. As used herein, an external surface of a face plate is a face plate surface directed towards a ball in normal address position. In conventional metallic striking plates that consist only of a metallic face plate, the external surface is the striking surface.

Cover layers such as the cover layer 330 can be formed and secured to a face plate using various methods. In one example, a striking surface of a cover layer is patterned with a mold. A selected roughness pattern is etched, machined, or otherwise transferred to a mold surface. The mold surface is then used to shape the striking surface of the cover layer for subsequent attachment to a composite face plate or other face plate. Such cover layers can be bonded with an adhesive to the face plate. Alternatively, the mold can be used to form the cover layer directly on the composite part. For example, a layer of a thermoplastic material (or pellets or other portions of such a material) can be situated on an external surface of a face plate, and the mold pressed against the thermoplastic material and the face plate at suitable temperatures and pressures so as to impress the roughness pattern on a thermoplastic layer, thereby forming a cover layer with a patterned surface. In another example, a thermoset material can be deposited on the external surface of the cover plate, and the mold pressed against the thermoset material and the face plate to provide a suitable cover layer thickness. The face plate, the thermoset material, and the mold are then raised to a suitable temperature so as to cure or otherwise fix the shape and thickness of the cover layer. These methods are examples only, and other methods can be used as may be convenient for various cover materials.

In another method, a layer of a so-called "peel ply" fabric is bonded to an exterior surface of a composite face plate (preferably as the face plate is fabricated) or to a striking surface on a polymer cover layer. In some examples, a thermoset material is used for the cover layer, while in other examples thermoplastic materials are used. With either type of material, the peel ply fabric is removably bonded to the cover layer (or to the face plate). The peel ply fabric is removed from the cover layer, leaving a textured or roughened striking surface. A striking surface texture can be selected based upon peel ply fabric texture, fabric orientation, and fiber size so as to achieve surface characteristics comparable to conventional metal woods and irons.

A representative peel ply based process is illustrated in FIGS. 40-42. A portion of a peel ply fabric 602 is oriented so the woven fibers in the fabric are along an x-axis 604 and a z-axis 606 based on an eventual striking plate orientation in a finished club. In other examples, different orientations can be used. Peel ply fabric weave is not generally or necessarily the same along the warp and the weft directions, and in some examples, the warp and weft are aligned preferentially along selected directions. As shown in FIG. 41, a resulting striking plate 610 includes a face plate 612 and a cover layer 614 that has a textured striking surface 616. A portion of the textured striking surface 616 is shown in FIG. 42 to illustrate the surface texture based on surface peaks 618 that are separated by about 0.27 mm and having a height H of about 0.03 mm. In the example of FIGS. 40-42, the cover layer 610 is about 0.5 mm thick.

Figure 43:
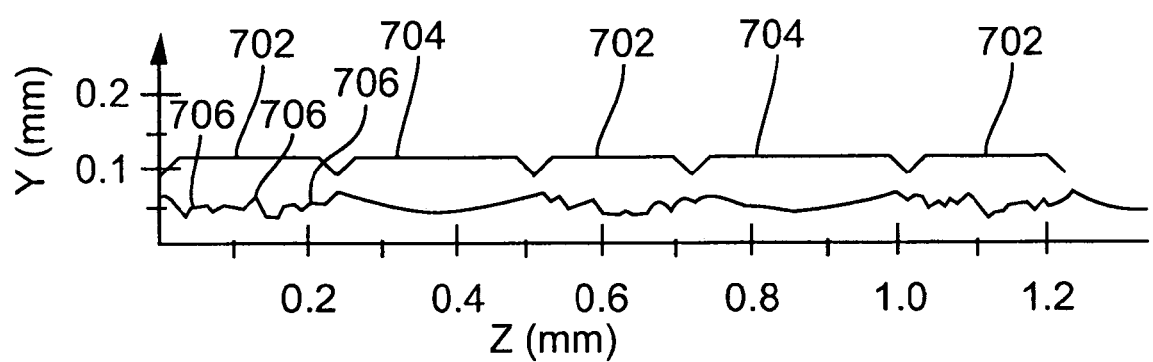
FIGS. 43-44 are surface profiles of a representative textured striking surface of polymer layer produced with a peel ply fabric.
Figure 44:
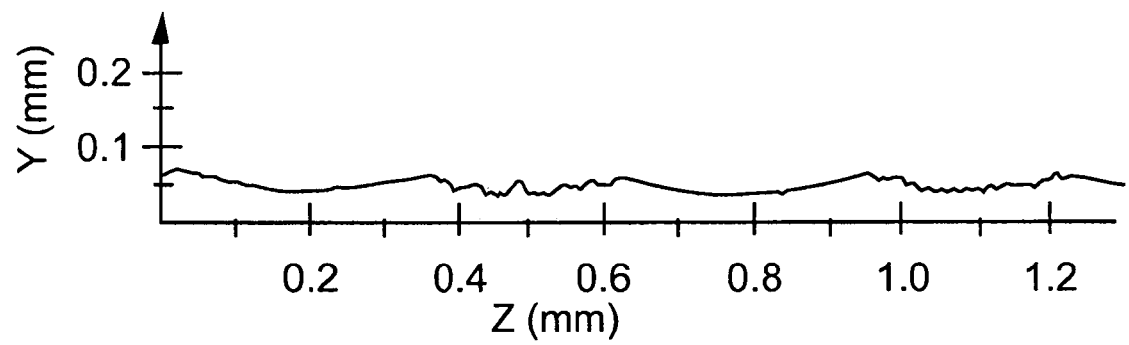
Figure 45:
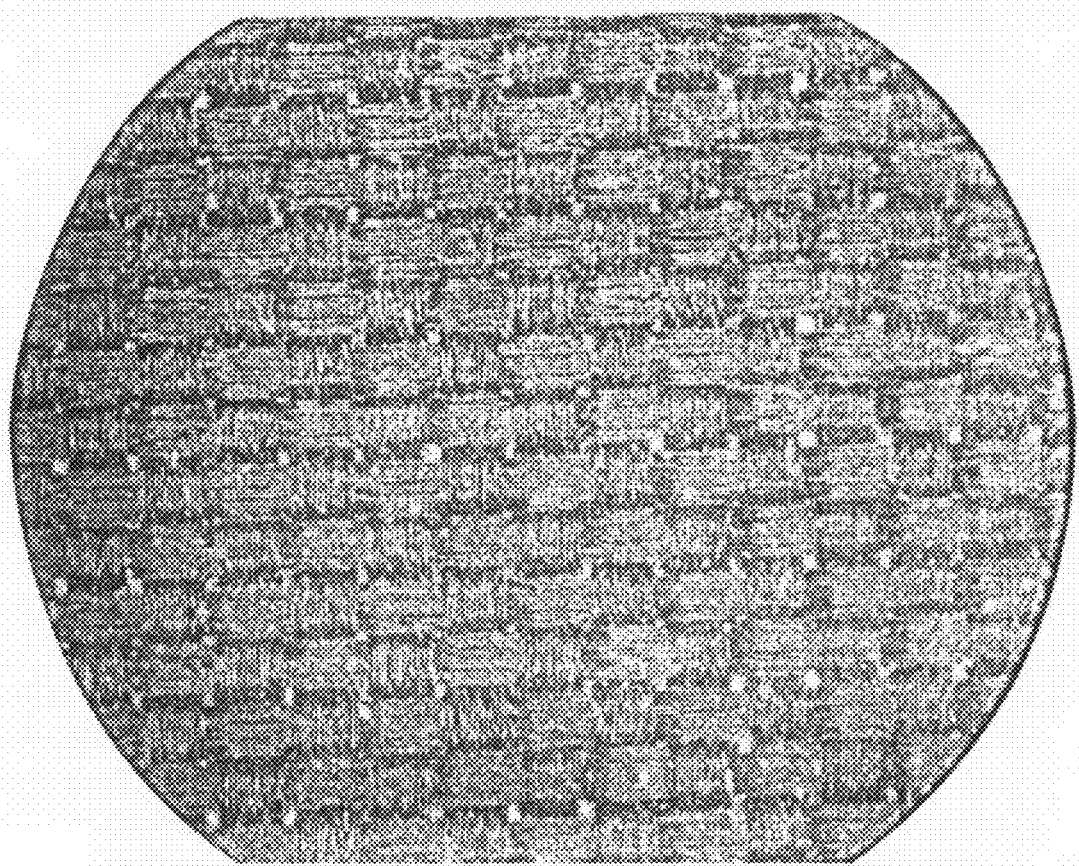
FIG. 45 is a photograph of a portion of a peel ply fabric textured surface.

Representative surface profiles of peel ply based striking surfaces are shown in FIGS. 43-44. FIG. 43 is portion of a toe-to-heel surface profile scan performed with a stylus-based surface profilometer as described further detail above. Relatively rough profile portions 702 are separated by profile portions 704 that correspond to more gradual surface curvatures. A plurality of peaks 706 in the rough profile portions 702 appear to correspond to a stylus crossing over features defined by individual peel ply fabric fibers. The smoother portions 704 appear to correspond to stylus scanning along a feature that is defined along a fiber direction. Surface peaks have a periodic separation of about 0.5 mm and a height of about 20-30 µm. FIG. 44 is a portion of a similar scan to that of FIG. 43 but along a top-to-bottom direction. Relatively smooth and rough areas alternate, and peak spacing is about 0.6 mm, slightly larger than that in the toe-to-heel direction, likely due to differing fiber spacings in peel ply fabric warp and weft. FIG. 45 is a photograph of a portion of a striking surface formed with a peel ply fabric.

Figure 46:
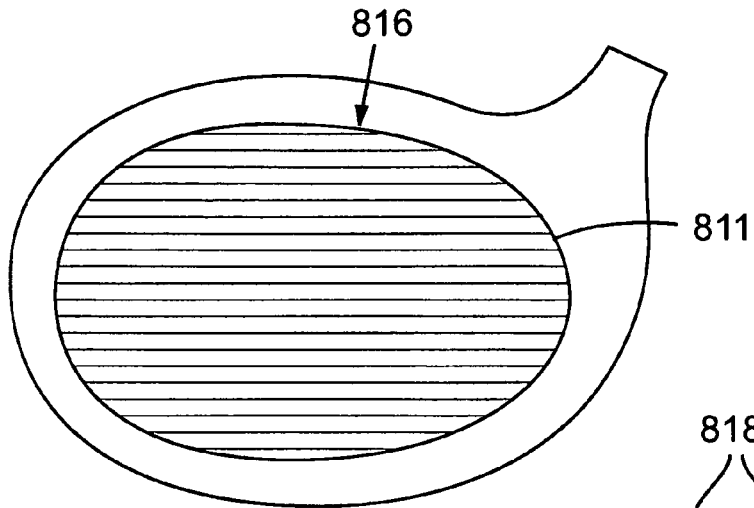
FIGS. 46-48 illustrate another representative striking plate that includes a cover layer having a roughened striking surface.
Figure 47:
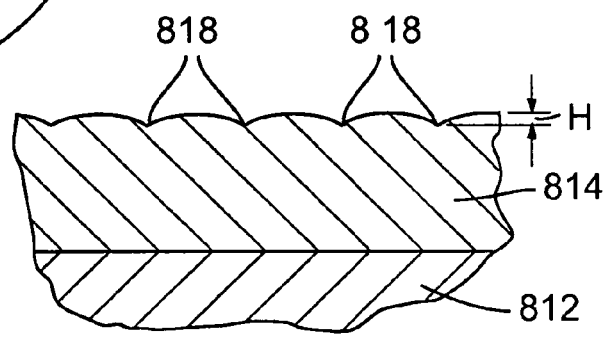
Figure 48:
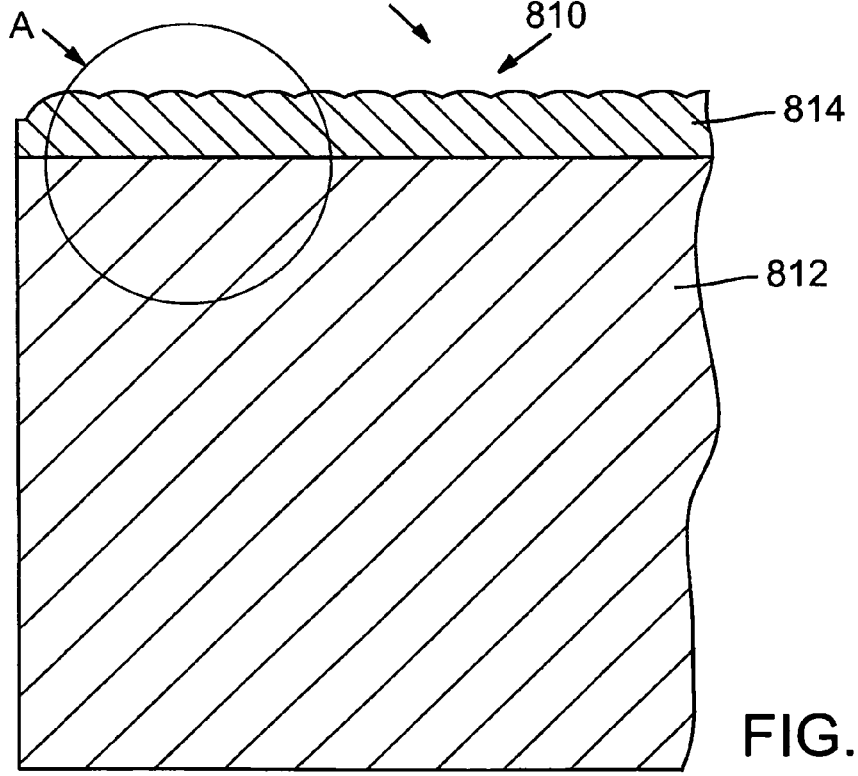
Figure 49:
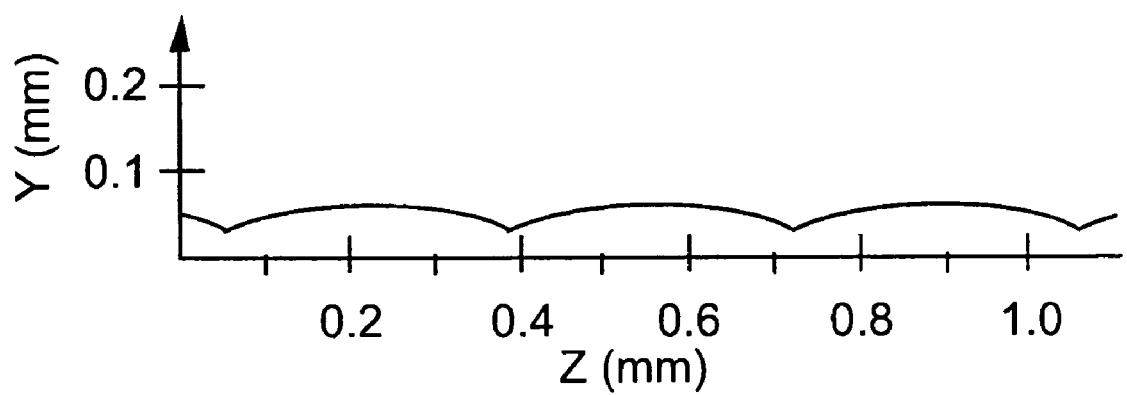
FIG. 49 is a surface profile of the roughened surface of FIGS. 46-48.

An example striking plate 810 based on a machined or other mold is shown in FIGS. 46-48. In this example, a surface texture 811 provided to a striking surface 816 is aligned with respect to a club and a club head substantially along an x-axis as shown in FIG. 46. FIGS. 47-48 illustrate the texture 811 of the striking surface 816 that is formed as a surface of a cover layer 814 that is situated on a face plate 812. As shown in FIG. 48, the cover layer 814 is about 0.5 mm thick, and the texture includes a plurality of valleys 818 separated by about 0.34 mm and about 40 µm deep. FIG. 49 includes a portion of a stylus-based top-to-bottom surface scan of a representative polymer surface showing bumps having a center to center spacing of about 0.34 mm.

The following table summarize surface roughness parameters associated with the scans of FIGS. 43-44 and 49. In typical examples, measured surface roughness is greater than about 0.1 µm, 1 µm, 2 µm, or 2.5 µm and less than about 20 µm, 10 µm, 5 µm, 4.5 µm, or 4 µm.

| Parameter | Toe-to-Heel Scan (Tooled Mold) | Toe-to-Heel Scan (Peel Ply Shaped) | Top-to-Bottom Scan (Peel Ply Shaped) |
|---|---|---|---|
| $R_a$ | 6.90 µm | 8.31 µm | 7.07 µm |
| $R_z$ | 29.4 µm | 49.0 µm | 48.7 µm |
| $R_p$ | 9.9 µm | 26.9 µm | 27.4 µm |
| RPc | 29.7/cm | 44.4/cm | 37.6/cm |
| $K_u$ | 2.41 | | |

Figure 36:
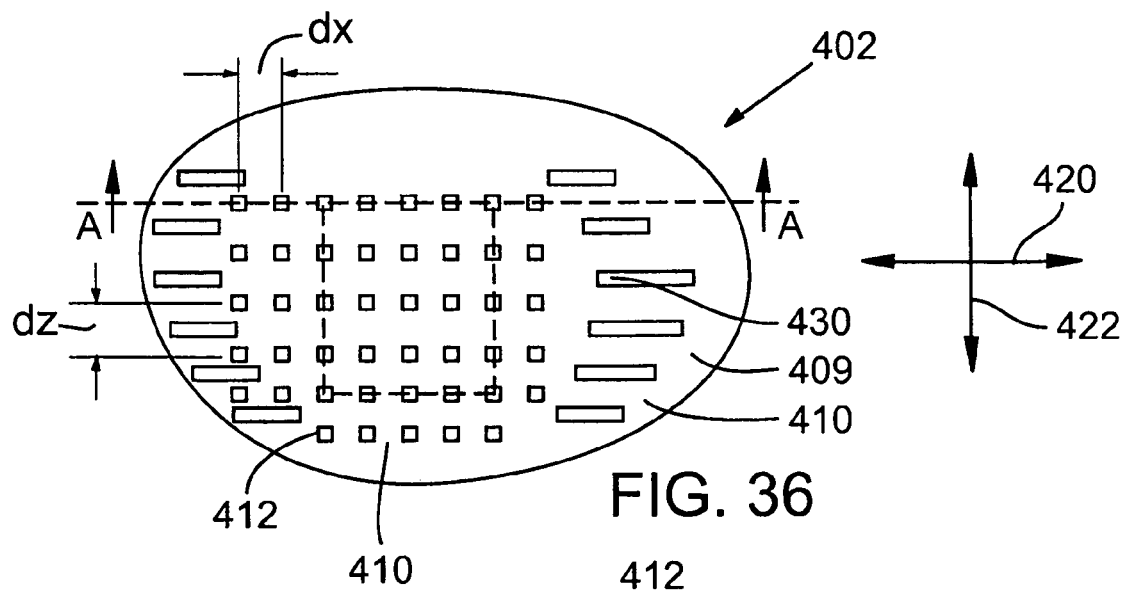
FIGS. 36-37 illustrate a representative striking plate that includes a cover layer having a roughened striking surface.
Figure 37:
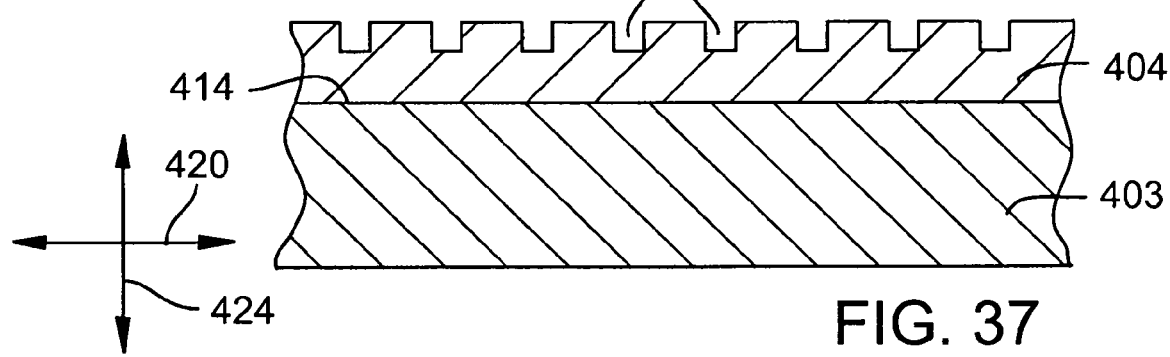

A striking surface of a cover layer can be provided with a variety of other roughness patterns some examples of which are illustrated in FIGS. 36-39. Typically these patterns extend over substantially the entire striking surface, but in some illustrated examples only a portion of the striking surface is shown for convenient illustration. Referring to FIGS. 36-37, a striking plate 402 includes a composite face plate 403 and a cover layer 404. A striking surface 409 of the cover layer includes a patterned area 410 that includes a plurality of pattern features 412 that are arranged in a two dimensional array. As shown in FIGS. 36-37, the pattern features 412 are rectangular or square depressions formed in the cover layer 404 and that extend along a +y-direction (i.e., inwardly towards an external surface 414 of the face plate 403). A horizontal spacing (along an x-axis 420) of the pattern features is dx and a vertical spacing (along a z-axis 422) is dz. These spacings can be the same or different, and the features 412 can be inwardly or outwardly directed and can be columns or depressions having square, circular, elliptical, polygonal, oval, or other cross-sections in an xz-plane. In addition, for cross-sectional shapes that are asymmetric, the pattern features can be arbitrarily aligned with respect to the x-axis 420 and the z-axis 422. The pattern features 412 can be located in a regular array, but the orientation of each of the pattern features can be arbitrary, or the pattern features can be periodically arranged along the x-axis 420, the z-axis 422, or another axis in the xz-plane. As shown in FIG. 36, a plurality of scorelines 430 are provided and are typically colored so as to provide a high contrast. A maximum depth dy of the pattern features 512 along the y-axis is between about 10 µm and 100 µm, between about 5 µm and 50 µm, or about 2 µm and 25 µm. The horizontal and vertical spacings are typically between about 0.025 mm and 0.500 mm While the pattern features 412 may have substantially constant cross-sectional dimensions in one or more planes perpendicular the xz-plane (i.e. vertical cross-sections), these vertical cross-sections can vary along a y-axis 424 or as a function of an angle of a cross-sectional plane with respect to the x-axis, the y-axis, or the z-axis. For example, columnar protrusions can have bases that taper outwardly, inwardly, or a combination thereof along the y-axis 424, and can be tilted with respect to the y-axis 424.

Figure 38:
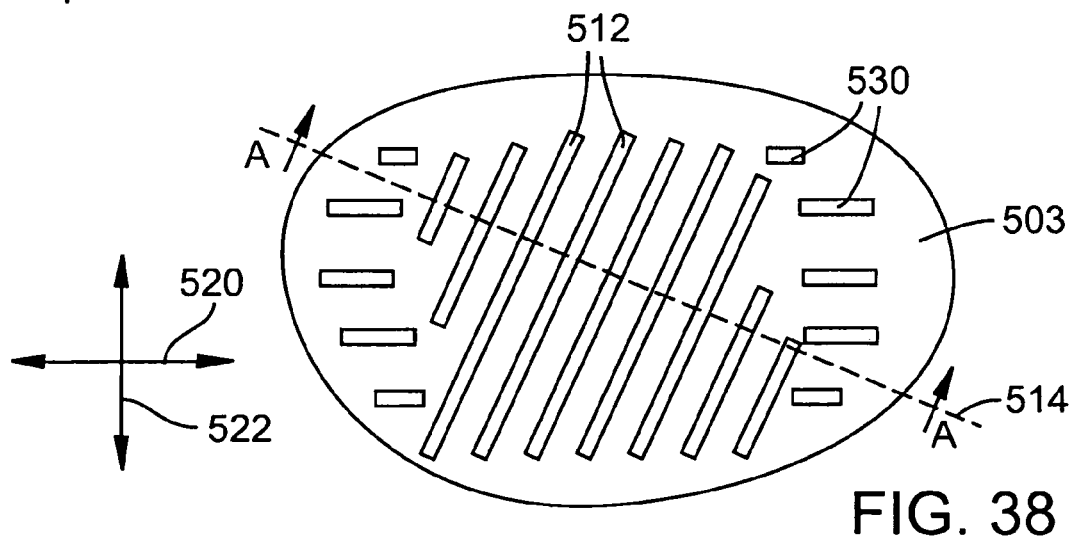
FIGS. 38-39 illustrate a representative striking plate that includes a cover layer having a roughened striking surface.
Figure 39:
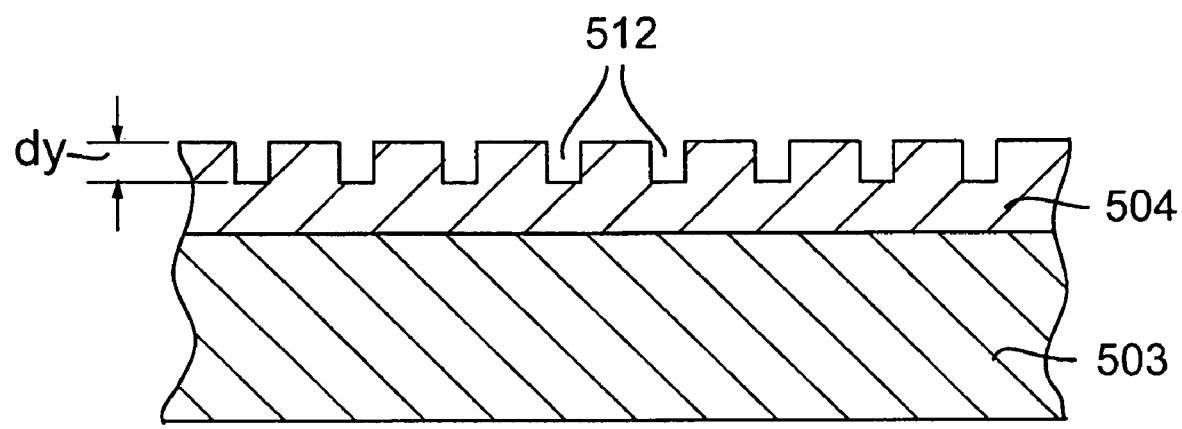

In an example shown in FIGS. 38-39, a cover layer 504 includes a plurality of pattern features 512 that are periodically situated along an axis 514 that is tilted with respect to an x-axis 520 and a z-axis 522. The pattern features 512 are periodic in one dimension, but in other examples, pattern features periodic along one more axes that are tilted (or aligned with) x- and z-axes can be provided. A plurality of scorelines 530 are provided (generally in a face plate) and are colored so as to provide a high contrast. As shown in FIG. 39, the cover layer 504 is secured to a face plate 503 and the pattern features 512 have a depth dy.

In other examples, pattern features can be periodic, aperiodic, or partially periodic, or randomly situated. Spatial frequencies associated with pattern features can vary, and pattern feature size and orientation can vary as well. In some examples, a roughened surface is defined as series of features that are randomly situated and sized.

Similar striking plates can be provided for iron-type golf clubs. While striking plates for wood-type golf clubs generally have top-to-bottom and toe-to-heel curvatures (commonly referred to as bulge and roll), striking plates for irons are typically flat. Composite-based striking plates for iron-type clubs typically include a polymer cover layer selected to protect the underlying composite face plate. In some examples, similar striking surface textures to those described above can be provided. In addition, one or more conventional grooves are generally provided on the striking surface. Such striking plates can be secured to iron-type golf club bodies with various adhesives or otherwise secured.

Representative Polymer Materials

Representative polymer materials suitable for face plate covers or caps are described herein.

DEFINITIONS

The term "bimodal polymer" as used herein refers to a polymer comprising two main fractions and more specifically to the form of the polymer's molecular weight distribution curve, i.e., the appearance of the graph of the polymer weight fraction as a function of its molecular weight. When the molecular weight distribution curves from these fractions are superimposed onto the molecular weight distribution curve for the total resulting polymer product, that curve will show two maxima or at least be distinctly broadened in comparison with the curves for the individual fractions. Such a polymer product is called bimodal. The chemical compositions of the two fractions may be different.

The term "chain extender" as used herein is a compound added to either a polyurethane or polyurea prepolymer, (or the prepolymer starting materials), which undergoes additional reaction but at a level sufficiently low to maintain the thermoplastic properties of the final composition The term "conjugated" as used herein refers to an organic compound containing two or more sites of unsaturation (e.g., carbon-carbon double bonds, carbon-carbon triple bonds, and sites of unsaturation comprising atoms other than carbon, such as nitrogen) separated by a single bond.

The term "curing agent" or "curing system" as used interchangeably herein is a compound added to either polyurethane or polyurea prepolymer, (or the prepolymer starting materials), which imparts additional crosslinking to the final composition to render it a thermoset.

The term "(meth)acrylate" is intended to mean an ester of methacrylic acid and/or acrylic acid.

The term "(meth)acrylic acid copolymers" is intended to mean copolymers of methacrylic acid and/or acrylic acid.

The term "polyurea" as used herein refers to materials prepared by reaction of a diisocyanate with a polyamine.

The term "polyurethane" as used herein refers to materials prepared by reaction of a diisocyanate with a polyol.

The term "prepolymer" as used herein refers to any material that can be further processed to form a final polymer material of a manufactured golf ball, such as, by way of example and not limitation, a polymerized or partially polymerized material that can undergo additional processing, such as crosslinking.

The term "thermoplastic" as used herein is defined as a material that is capable of softening or melting when heated and of hardening again when cooled. Thermoplastic polymer chains often are not cross-linked or are lightly crosslinked using a chain extender, but the term "thermoplastic" as used herein may refer to materials that initially act as thermoplastics, such as during an initial extrusion process or injection molding process, but which also may be crosslinked, such as during a compression molding step to form a final structure.

The term "thermoplastic polyurea" as used herein refers to a material prepared by reaction of a prepared by reaction of a diisocyanate with a polyamine, with optionally addition of a chain extender.

The "thermoplastic polyurethane" as used herein refers to a material prepared by reaction of a diisocyanate with a polyol, with optionally addition of a chain extender.

The term "thermoset" as used herein is defined as a material that crosslinks or cures via interaction with as crosslinking or curing agent. The crosslinking may be brought about by energy in the form of heat (generally above 200 degrees Celsius), through a chemical reaction (by reaction with a curing agent), or by irradiation. The resulting composition remains rigid when set, and does not soften with heating. Thermosets have this property because the long-chain polymer molecules cross-link with each other to give a rigid structure. A thermoset material cannot be melted and re-molded after it is cured thus thermosets do not lend themselves to recycling unlike thermoplastics, which can be melted and re-molded.

The term "thermoset polyurethane" as used herein refers to a material prepared by reaction of a diisocyanate with a polyol, and a curing agent.

The term "thermoset polyurea" as used herein refers to a material prepared by reaction of a diisocyanate with a polyamine, and a curing agent.

The term "urethane prepolymer" as used herein is the reaction product of diisocyante and a polyol.

The term "urea prepolymer" as used herein is the reaction product of a diisocyanate and a polyamine.

The term "unimodal polymer" refers to a polymer comprising one main fraction and more specifically to the form of the polymer's molecular weight distribution curve, i.e., the molecular weight distribution curve for the total polymer product shows only a single maximum.

Materials

Polymeric materials generally considered useful for making the golf club face cap according to the present invention include both synthetic or natural polymers or blend thereof including without limitation, synthetic and natural rubbers, thermoset polymers such as other thermoset polyurethanes or thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyamides, copolyamides, polyesters, copolyesters, polycarbonates, polyolefins, halogenated (e.g. chlorinated) polyolefins, halogenated polyalkylene compounds, such as halogenated polyethylene [e.g. chlorinated polyethylene (CPE)], polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic copolymers, functionalized styrenic copolymers, functionalized styrenic terpolymers, styrenic terpolymers, cellulosic polymers, liquid crystal polymers (LCP), ethylene-propylene-diene terpolymers (EPDM), ethylene-vinyl acetate copolymers (EVA), ethylene-propylene copolymers, ethylene vinyl acetates, polyureas, and polysiloxanes and any and all combinations thereof.

One preferred family of polymers for making the golf club face cap of the present invention are the thermoplastic or thermoset polyurethanes and polyureas made by combination of a polyisocyanate and a polyol or polyamine respectively. Any isocyanate available to one of ordinary skill in the art is suitable for use in the present invention including, but not limited to, aliphatic, cycloaliphatic, aromatic aliphatic, aromatic, any derivatives thereof, and combinations of these compounds having two or more isocyanate (NCO) groups per molecule.

Any polyol available to one of ordinary skill in the polyurethane art is suitable for use according to the invention. Polyols suitable for use include, but are not limited to, polyester polyols, polyether polyols, polycarbonate polyols and polydiene polyols such as polybutadiene polyols.

Any polyamine available to one of ordinary skill in the polyurea art is suitable for use according to the invention. Polyamines suitable for use include, but are not limited to, amine-terminated hydrocarbons, amine-terminated polyethers, amine-terminated polyesters, amine-terminated polycaprolactones, amine-terminated polycarbonates, amine-terminated polyamides, and mixtures thereof.

The previously described diisocyante and polyol or polyamine components may be previously combined to form a prepolymer prior to reaction with the chain extender or curing agent. Any such prepolymer combination is suitable for use in the present invention. Commercially available prepolymers include LFH580, LFH120, LFH710, LFH1570, LF930A, LF950A, LF601D, LF751D, LFG963A, LFG640D.

One preferred prepolymer is a toluene diisocyanate prepolymer with polypropylene glycol. Such polypropylene glycol terminated toluene diisocyanate prepolymers are available from Uniroyal Chemical Company of Middlebury, Conn., under the trade name ADIPRENE® LFG963A and LFG640D. Most preferred prepolymers are the polytetramethylene ether glycol terminated toluene diisocyanate prepolymers including those available from Uniroyal Chemical Company of Middlebury, Conn., under the trade name ADIPRENE® LF930A, LF950A, LF601D, and LF751D.

Polyol chain extenders or curing agents may be primary, secondary, or tertiary polyols. Diamines and other suitable polyamines may be added to the compositions of the present invention to function as chain extenders or curing agents. These include primary, secondary and tertiary amines having two or more amines as functional groups.

Depending on their chemical structure, curing agents may be slow- or fast-reacting polyamines or polyols. As described in U.S. Pat. Nos. 6,793,864, 6,719,646 and copending U.S. Patent Publication No. 2004/0201133 A1, (the contents of all of which are hereby incorporated herein by reference).

Suitable curatives for use in the present invention are selected from the slow-reacting polyamine group include, but are not limited to, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, and mixtures thereof. Of these, 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name POLAMINES by Polaroid Corporation. N,N'-dialkyldiamino diphenyl methane is sold under the trade name UNILINK® by UOP. Suitable fast-reacting curing agent can be used include diethyl-2,4-toluenediamine,4,4"-methylenebis-(3-chloro,2,6-diethyl)-aniline (available from Air Products and Chemicals Inc., of Allentown, Pa., under the trade name LONZACURE®), 3,3'-dichlorobenzidene; 3,3'-dichloro-4,4'-diaminodiphenyl methane (MOCA); N,N,N', N'-tetrakis(2-hydroxypropyl)ethylenediamine and Curalon L, a trade name for a mixture of aromatic diamines sold by Uniroyal, Inc. or any and all combinations thereof. A preferred fast-reacting curing agent is diethyl-2,4-toluene diamine, which has two commercial grades names, Ethacure® 100 and Ethacure® 100LC commercial grade has lower color and less by-product. Blends of fast and slow curing agents are especially preferred.

In another preferred embodiment the polyurethane or polyurea is prepared by combining a diisocyanate with either a polyamine or polyol or a mixture thereof and one or more dicyandiamides. In a preferred embodiment the dicyandiamide is combined with a urethane or urea prepolymer to form a reduced-yellowing polymer composition as described in U.S. Patent Application No. 60/852,582 filed on Oct. 17, 2006, the entire contents of which are herein incorporated by reference in their entirety. Another preferred family of polymers for making the golf club face cap of the present invention are thermoplastic ionomer resins. One family of such resins was developed in the mid-1960's, by E.I. DuPont de Nemours and Co., and sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those derived by neutralization of for example formic acid, acetic acid, nitric acid, and carbonic acid. The salts may also include hydrogen carbonate salts, metal oxides, metal hydroxides, and metal alkoxides.

Today, there are a wide variety of commercially available ionomer resins based both on copolymers of ethylene and (meth)acrylic acid or terpolymers of ethylene and (meth) acrylic acid and (meth)acrylate, all of which many of which are be used as a golf club component such as a cover layer that provides a striking surface. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8$ $\alpha,\beta$ ethylenically unsaturated carboxylic acid, such as acrylic or methacrylic acid, and is present in an amount from about 2 to about 30 weight % of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight % of the E/X/Y copolymer, and wherein the acid groups present in said ionomeric polymer are partially neutralized with a metal selected from the group consisting of lithium, sodium, potassium, magnesium, calcium, barium, lead, tin, zinc or aluminum, and combinations thereof.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights In addition to the unimodal and bimodal ionomers, also included are the so-called "modified ionomers" examples of which are described in U.S. Pat. Nos. 6,100,321, 6,329,458 and 6,616,552 and U.S. Patent Publication U.S. 2003/0158312 A1, the entire contents of all of which are herein incorporated by reference. An example of such a modified ionomer polymer is DuPont® HPF-1000 available from E. I. DuPont de Nemours and Co. Inc.

Also useful for making the golf club face cap of the present invention is a blend of an ionomer and a block copolymer. A preferred block copolymer is SEPTON HG-252. Such blends are described in more detail in commonly-assigned U.S. Pat. No. 6,861,474 and U.S. Patent Publication No. 2003/0224871 both of which are incorporated herein by reference in their entireties.

In a further embodiment, the golf club face cap of the present invention can comprise a composition prepared by blending together at least three materials, identified as Components A, B, and C, and melt-processing these components to form in-situ, a polymer blend composition incorporating a pseudo-crosslinked polymer network. Such blends are described in more detail in commonly-assigned U.S. Pat. No. 6,930,150, to Kim et al., the content of which is incorporated by reference herein in its entirety.

Component A is a monomer, oligomer, prepolymer or polymer that incorporates at least five percent by weight of at least one type of an acidic functional group. Examples of such polymers suitable for use as include, but are not limited to, ethylene/(meth)acrylic acid copolymers and ethylene/(meth) acrylic acid/alkyl (meth)acrylate terpolymers, or ethylene and/or propylene maleic anhydride copolymers and terpolymers.

As discussed above, Component B can be any monomer, oligomer, or polymer, preferably having a lower weight percentage of anionic functional groups than that present in Component A in the weight ranges discussed above, and most preferably free of such functional groups. Preferred materials for use as Component B include polyester elastomers marketed under the name PEBAX and LOTADER marketed by ATOFINA Chemicals of Philadelphia, Pa.; HYTREL, FUSABOND, and NUCREL marketed by E.I. DuPont de Nemours & Co. of Wilmington, Del.; SKYPEL and SKYTHANE by S.K. Chemicals of Seoul, South Korea; SEPTON and HYBRAR marketed by Kuraray Company of Kurashiki, Japan; ESTHANE by Noveon; and KRATON marketed by Kraton Polymers. A most preferred material for use as Component B is SEPTON HG-252. Component C is a base capable of neutralizing the acidic functional group of Component A and is a base having a metal cation. These metals are from groups IA, IB, IIA, IIB, IIIA, IIIB, IVA, IVB, VA, VB, VIA, VIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal oxides, metal carbonates, or metal acetates. The composition preferably is prepared by mixing the above materials into each other thoroughly, either by using a dispersive mixing mechanism, a distributive mixing mechanism, or a combination of these.

In a further embodiment, the golf club face cap of the present invention can comprise a polyamide. Specific examples of suitable polyamides include polyamide 6; polyamide 11; polyamide 12; polyamide 4,6; polyamide 6,6; polyamide 6,9; polyamide 6,10; polyamide 6,12; polyamide MXD6; PA12, CX; PA12, IT; PPA; PA6, IT; and PA6/PPE.

The polyamide may be any homopolyamide or copolyamide. One example of a group of suitable polyamides is thermoplastic polyamide elastomers. Thermoplastic polyamide elastomers typically are copolymers of a polyamide and polyester or polyether. For example, the thermoplastic polyamide elastomer can contain a polyamide (Nylon 6, Nylon 66, Nylon 11, Nylon 12 and the like) as a hard segment and a polyether or polyester as a soft segment. In one specific example, the thermoplastic polyamides are amorphous copolyamides based on polyamide (PA 12). Suitable amide block polyethers include those as disclosed in U.S. Pat. Nos. 4,331,786; 4,115,475; 4,195,015; 4,839,441; 4,864,014; 4,230,848 and 4,332,920.

One type of polyetherester elastomer is the family of Pebax, which are available from Elf-Atochem Company. Preferably, the choice can be made from among Pebax 2533, 3533, 4033, 1205, 7033 and 7233. Blends or combinations of Pebax 2533, 3533, 4033, 1205, 7033 and 7233 can also be prepared, as well. Some examples of suitable polyamides for use include those commercially available under the trade names PEBAX, CRISTAMID and RILSAN marketed by Atofina Chemicals of Philadelphia, Pa., GRIVORY and GRILAMID marketed by EMS Chemie of Sumter, S.C., TROGAMID and VESTAMID available from Degussa, and ZYTEL marketed by E.I. DuPont de Nemours & Co., of Wilmington, Del.

The polymeric compositions used to prepare the golf club face cap of the present invention also can incorporate one or more fillers. Such fillers are typically in a finely divided form, for example, in a size generally less than about 20 mesh, preferably less than about 100 mesh U.S. standard size, except for fibers and flock, which are generally elongated. Filler particle size will depend upon desired effect, cost, ease of addition, and dusting considerations. The appropriate amounts of filler required will vary depending on the application but typically can be readily determined without undue experimentation.

The filler preferably is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten, steel, copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide. In another preferred embodiment the filler comprises a continuous or non-continuous fiber. In another preferred embodiment the filler comprises one or more so called nanofillers, as described in U.S. Pat. No. 6,794,447 and copending U.S. patent application Ser. No. 10/670,090 filed on Sep. 24, 2003 and copending U.S. patent application Ser. No. 10/926,509 filed on Aug. 25, 2004, the entire contents of each of which are incorporated herein by reference.

Another particularly well-suited additive for use in the compositions of the present invention includes compounds having the general formula:

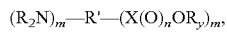

$(R_2N)_m-R'-(X(O)_nOR_y)_m,$ wherein R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S or P with the proviso that when X=C, n=1 and y=1 and when X=S, n=2 and y=1, and when X=P, n=2 and y=2. Also, m=1-3. These materials are more fully described in copending U.S. patent application Ser. No. 11/182,170, filed on Jul. 14, 2005, the entire contents of which are incorporated herein by reference. Most preferably the material is selected from the group consisting of 4,4'-methylene-bis-(cyclohexylamine)-carbamate (commercially available from R.T. Vanderbilt Co., Norwalk Conn. under the tradename Diak®4), 11-aminoundecanoicacid, 12-aminododecanoic acid, epsilon-caprolactam; omega-caprolactam, and any and all combinations thereof.

If desired, the various polymer compositions used to prepare the golf club face cap of the present invention can additionally contain other conventional additives such as, antioxidants, or any other additives generally employed in plastics formulation. Agents provided to achieve specific functions, such as additives and stabilizers, can be present. Examplary suitable ingredients include plasticizers, pigments colorants, antioxidants, colorants, dispersants, U.V. absorbers, optical brighteners, mold releasing agents, processing aids, fillers, and any and all combinations thereof. UV stabilizers, or photo stabilizers such as substituted hydroxphenyl benzotriazoles may be utilized in the present invention to enhance the UV stability of the final compositions. An example of a commercially available UV stabilizer is the stabilizer sold by Ciba Geigy Corporation under the tradename TINUVIN Whereas the invention has been described in connection with representative embodiments, it will be understood that the invention is not limited to those embodiments. On the contrary, the invention is intended to encompass all modifications, alternatives, and equivalents as may fall within the spirit and scope of the invention, as defined by the appended claims.

I claim:

1. A method for making a golf club head having a club head body and a composite face plate, the method comprising:
    forming a lay-up of multiple prepreg plies, each prepreg ply comprising at least one layer of reinforcing fibers impregnated with a resin;
    at least partially curing the lay-up in a mold so as to form an at least partially cured lay-up having a bulge and roll;
    removing the at least partially cured lay-up from the mold;
    water-jet cutting the at least partially cured lay-up to form a composite part having specified dimensions and shaped for use as a face plate or part of a face plate in a club head; and
    mounting the face plate to the club head body.

2. The method of claim 1, wherein the lay-up, prior to cutting, has a central portion and a sacrificial portion completely surrounding the central portion, and the act of water-jet cutting comprises water-jet cutting the sacrificial portion from the central portion, which forms the composite part.

3. The method of claim 2, wherein the act of at least partially curing the lay-up leaves no more than one void in the central portion of the partially cured lay-up.

4. The method of claim 2, wherein the act of at least partially curing the lay-up removes all voids from the central portion of the partially cured lay-up.

5. The method of claim 1, further comprising placing an outer layer on the composite part, the outer layer defining a striking surface of the face plate.

6. The method of claim 5, wherein the outer layer comprises a polymeric layer.

7. The method of claim 5, wherein the outer layer comprises a metal layer.

8. The method of claim 7, wherein the metal layer is made of titanium, aluminum, magnesium, steel, or alloys thereof.

9. The method of claim 1, wherein the lay-up has a varying thickness.

10. The method of claim 1, wherein the resin comprises a thermoset resin.

11. The method of claim 1, wherein the club head body defines a front opening and the face plate is mounted to the club head body so as to cover the front opening.

12. The method of claim 1, wherein the lay-up has first and second opposing surfaces and a thickness measured from the first surface to the second surface, and the act of water-jet cutting the at least partially cured lay-up forms an outer peripheral edge of the composite part that extends from the first surface to the second surface.

13. The method of claim 1, wherein the resin cross-links during curing.

14. A method for making a golf club head having a club head body and a composite face plate, the method comprising:
    forming a lay-up of multiple prepreg plies, each prepreg ply comprising at least one layer of reinforcing fibers impregnated with a resin, wherein at least a portion of the plies comprise a plurality of elongated pre-preg strips arranged in a criss-cross pattern defining an overlapping region where the strips overlap each other, the lay-up having a first thickness at a location spaced from the overlapping region and a second thickness at the overlapping region, the second thickness being greater than the first thickness
    at least partially curing the lay-up ;
    water-jet cutting the at least partially cured lay-up to form a composite part having specified dimensions and shaped for use as a face plate or part of a face plate in a club head; and
    mounting the face plate to the club head body.

15. The method of claim 14, wherein:
    the lay-up, prior to cutting, has a central portion and a sacrificial portion completely surrounding the central portion, each prepreg strip extending continuously through the central portion and having opposite end portions extending into the sacrificial portion;
    and the act of water-jet cutting comprises water-jet cutting the sacrificial portion from the central portion, which forms the composite part.

16. A method for making a golf club head having a club head body and a composite face plate, the method comprising:
    forming a lay-up of multiple prepreg composite plies, wherein at least a portion of the plies comprise elongated strips arranged in a criss-cross pattern defining one or more areas of increased thickness in the lay-up where one ore more of the strips overlap each other;
    at least partially curing the lay-up;
    trimming the at least partially cured lay-up by water-jet cutting to form a part having specified dimensions and shaped for use as a face plate or part of a face plate in a club head; and
    mounting the face plate to the club head body.

17. The method of claim 16, wherein the part, after trimming, has a void content of about $1.7 \times 10^{-6}$ percent or less by volume.

18. The method of claim 16, wherein the part, after trimming, does not have any voids.

19. The method of claim 16, wherein:
    the lay-up, prior to trimming, has a central portion and a sacrificial portion completely surrounding the central portion, each strip extending continuously through the central portion and having opposite end portions extending into the sacrificial portion;
    and the act of trimming comprises trimming the sacrificial portion from the central portion by water-jet cutting to form the part.

20. The method of claim 16, further comprising placing an outer layer on a front surface of the part to form a striking face of a face plate.

21. The method of claim 16, wherein the strips are arranged within the lay-up to form a central projection of the lay-up having a first thickness and a peripheral portion surrounding the projection having a second thickness that is less than the first thickness.

22. The method of claim 16, wherein strips are arranged within the lay-up to form an annular projection of the lay-up having a first thickness and a recessed portion of the lay-up surrounded by the projection, the recessed portion having a second thickness that is less than the first thickness.

23. The method of claim 16, wherein another portion of the plies comprise a plurality of oversized plies each having a central portion and a peripheral sacrificial portion completely surrounding the central portion, and the act of trimming the at least partially cured lay-up comprises water-jet cutting the partially cured lay-up to remove the sacrificial portion from the central portion, which forms the part.

24. The method of claim 23, wherein the oversized plies are arranged in groups of oversized plies, and the strips are arranged in groups of strips that are interspersed between the groups of oversized plies.

* * * * *